US011250190B2

(12) United States Patent
Pednault et al.

(10) Patent No.: US 11,250,190 B2
(45) Date of Patent: Feb. 15, 2022

(54) SIMULATING QUANTUM CIRCUITS

(71) Applicant: International Business Machines Corporation, Armonk, NY (US)

(72) Inventors: Edwin Peter Dawson Pednault, Cortlandt Manor, NY (US); John A. Gunnels, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 15/713,323

(22) Filed: Sep. 22, 2017

(65) Prior Publication Data
US 2019/0095561 A1    Mar. 28, 2019

(51) Int. Cl.
*G06F 30/33*        (2020.01)
*G06N 10/00*        (2019.01)
(Continued)

(52) U.S. Cl.
CPC .............. *G06F 30/33* (2020.01); *G06F 17/16* (2013.01); *G06N 10/00* (2019.01); *G06F 2111/10* (2020.01)

(58) Field of Classification Search
CPC .. G06F 17/16; G06F 17/5022; G06F 2217/16; G06N 10/00
See application file for complete search history.

(56) References Cited

U.S. PATENT DOCUMENTS

| 8,972,237 B2 | 3/2015 | Wecker |
| 9,064,067 B2 | 6/2015 | Wecker |

(Continued)

FOREIGN PATENT DOCUMENTS

| CN | 1959708 A | 5/2007 |
| CN | 104750945 A | 7/2015 |

(Continued)

OTHER PUBLICATIONS

"PCT International Search Report and Written Opinion", International application No. PCT/IB2017/057566, International filing date Dec. 1, 2017, dated Jun. 27, 2018, 9 pages.

(Continued)

*Primary Examiner* — Kamini S Shah
*Assistant Examiner* — Peter Pham
(74) *Attorney, Agent, or Firm* — Edward Li

(57) ABSTRACT

A computer implemented method includes receiving a digital description of a quantum circuit, partitioning the digital description of the quantum circuit into a plurality of quantum sub-circuits wherein each quantum sub-circuit of the plurality of quantum sub-circuits comprises one or more quantum gates, determining sub-circuit dependencies for the plurality of quantum sub-circuits, simulating the plurality of quantum sub-circuits according to the sub-circuit dependencies to produce simulation results for each quantum sub-circuit of the plurality of quantum sub-circuits, wherein a first and a second quantum sub-circuit of the plurality of quantum sub-circuits each contain one or more gates that are applied to a common qubit, and wherein the first and the second quantum sub-circuit are simulated independently using an entangled tensor index. A corresponding computer system and computer program product are also disclosed herein.

9 Claims, 18 Drawing Sheets

(51) Int. Cl.
    *G06F 17/16*     (2006.01)
    *G06F 111/10*     (2020.01)

(56) References Cited

U.S. PATENT DOCUMENTS

| | | | |
|---|---|---|---|
| 9,477,796 | B2 | 10/2016 | Garcia-Ramirez et al. |
| 2006/0123363 | A1* | 6/2006 | Williams ............... G06N 10/00 716/101 |
| 2006/0224547 | A1* | 10/2006 | Ulyanov ............... G06N 10/00 706/62 |
| 2008/0140749 | A1 | 6/2008 | Amato et al. |
| 2011/0138344 | A1* | 6/2011 | Ahn ........................ G06F 30/33 716/104 |
| 2014/0039866 | A1 | 2/2014 | Wecker |
| 2014/0040849 | A1 | 2/2014 | Wecker |
| 2015/0339417 | A1 | 11/2015 | Garcia-Ramirez et al. |
| 2016/0070830 | A1 | 3/2016 | Moroz et al. |
| 2017/0017742 | A1 | 1/2017 | Oberg et al. |
| 2017/0316336 | A1* | 11/2017 | Bocharov .............. G06N 10/00 |
| 2018/0096085 | A1* | 4/2018 | Rubin .................... G16C 10/00 |
| 2018/0181685 | A1* | 6/2018 | Roetteler ............... G06N 10/00 |
| 2018/0240035 | A1* | 8/2018 | Scheer .................. H03K 19/195 |
| 2019/0018912 | A1* | 1/2019 | Mosca .................. G06F 30/337 |
| 2019/0266510 | A1* | 8/2019 | Yarkoni ................. B82Y 10/00 |

FOREIGN PATENT DOCUMENTS

| | | |
|---|---|---|
| CN | 111052122 A | 4/2020 |
| DE | 112017007826 T5 | 4/2020 |
| GB | 2579008 A | 5/2020 |
| JP | 2013513181 A | 4/2013 |
| JP | 2020534603 A | 11/2020 |
| WO | 2011071282 W | 6/2011 |
| WO | 2016081788 A1 | 5/2016 |
| WO | 2016179419 A1 | 11/2016 |
| WO | 2017127923 A1 | 8/2017 |
| WO | 2019058161 A1 | 3/2019 |

OTHER PUBLICATIONS

Boixo et al., "Characterizing Quantum Supremacy in Near-Term Devices", arXiv:1608.00263v2 [quant-ph] Apr. 5, 2017, 23 pages.
Darmawan et al., "Tensor-Network Simulations of the Surface Code under Realistic Noise", arXiv:1607.06460v2 [quant-ph\ Aug. 1, 2017, 8 pages.
Haner et al., "0.5 Petabyte Simulation of a 45-Qubit Quantum Circuit", Institute for Theoretical Physics, ETH Zurich, 8093 Zurich, Switzerland, arXiv:1704.01127v2 [quant-ph] Sep. 18, 2017, 10 pages.
IBM, "IBM Makes Quantum Computing Available on IBM Cloud to Accelerate Innovation", News Room, News Releases, Yorktown Heights, N.Y., May 4, 2016, 4 pages, <https://www-03.ibm.com/press/us/en/pressrelease/49661.wss>.
Frisch, Albert, PhD, "IBM Q Quantum Computing", Ehningen—Jul. 12, 2017, © 2017 IBM, 32 pages, <https://www-01.ibm.com/events/wwe/grp/grp308.nsf/vLookupPDFs/07%20Quantum%20Computing%20cognitive%20event/$file/07%20Quantum%20Computing%20cognitive%20event.pdf>.
"Patents Act 1977 Examination Report under Section 18(3)", Application No. GB2004044.0, dated Apr. 28, 2020, 7 pages.
"Notification of Reasons for Refusal," for Japanese Patent Application No. 2020-515693, translated Jun. 22, 2021, 3 pages.
Khammassi, et al., "QX: A High-Performance Quantum Computer Simulation Platform", Date '17: Proceedings of the Conference on Design, Automation & Test in Europe, Mar. 2017, pp. 464-469, <https://dl.acm.org/doi/10.5555/3130379.3130487>.
Avila et al., "Optimizing D-GM quantum computing by exploring parallel and distributed quantum simulations under GPUs arquitecture", © 2016 IEEE, 2016 IEEE Congress on Evolutionary Computation (CEC), 8 pages.
Baumgartner et al., "Synthesis of High-Performance Parallel Programs for a Class of Ab Initio Quantum Chemistry Models", Proceedings of the IEEE, vol. 93, No. 2, Feb. 2005, © 2005 IEEE, 17 pages.
Boixo et al., "Characterizing Quantum Supremacy in Near-Term Devices", arXiv:1608.00263v2 [quant-ph] Aug. 3, 2016, 23 pages.
Haner et al., "0.5 Petabyte Simulation of a 45-Qubit Quantum Circuit", Institute for Theoretical Physics, ETH Zurich, 8093 Zurich, Switzerland, arXiv:1704.01127v1 [quant-ph] Apr. 4, 2017, 11 pages.
Hayes et al., "Programmable Quantum Simulation by Dynamic Hamiltonian Engineering", arXiv:1309.6736v4 [quant-ph] Jun. 18, 2014, 23 pages.
Markov et al., "Simulating Quantum Computation by Contracting Tensor Networks*", Siam J. Comput., vol. 38, No. 3, pp. 963-981, 2008 Society for Industrial and Applied Mathematics.
Nikahd et al., "OWQS: One-Way Quantum Computation Simulator", 2012 15th Euromicro Conference on Digital System Design, © 2012 IEEE, DOI 10.1109/DSD.2012.100, 7 pages.
Solomonik et al., "A massively parallel tensor contraction framework for coupled-cluster computations", J. Parallel Distrib. Comput. 74 (2014) 3176-3190, http://dx.doi.org/10.1016/j.jpdc.2014.06.002 0743-7315/ © 2014 Elsevier Inc., 15 pages.
Xue et al., "Divide and Conquer Algorithms for Quantum Circuit Simulation", Article in Tien Tzu Hsueh Pao/Acta Electronica Sinica—Feb. 2010, ResearchGate, 5 pages.
Aaronson et al., "Complexity-Theoretic Foundations of Quantum Supremacy Experiments", printed on Sep. 22, 2017, 66 pages.
Lomont, Chris, "Quantum Circuit Identities", arXiv:quant-ph/0307111v1, Jul. 16, 2003, 6 pages.
Maslov et al., "Quantum Circuit Simplification and Level Compaction*", arXiv:quant-ph/0604001v2 Feb. 27, 2008, 13 pages.
"Cyclops Tensor Framework: CTF::Tensor<dtype> Class Template Reference", printed on Sep. 22, 2017, 56 pages.
"GitHub—QISKit/openqasm", Gate and operation specification for quantum circuits, printed on Sep. 25, 2017, 3 pages.
"QISKit OPENQASM", developerWorks Open, printed on Sep. 25, 2017, 5 pages.
"Quantum gate", From Wikipedia, the free encyclopedia, this page was last edited on Sep. 19, 2017, 8 pages, https://en.wikipedia.org/wiki/Quantum_gate>.
"Slicing and Joining", TensorFlow, last updated Feb. 15, 2017, 52 pages.
"Toffoli gate", From Wikipedia, the free encyclopedia, this page was last edited on May 7, 2017, 4 pages, <https://en.wikipedia.org/wiki/Toffoli_gate>.

* cited by examiner

110 → $|\psi\rangle = \alpha_0|0\rangle + \alpha_1|1\rangle + \alpha_2|2\rangle + \alpha_3|3\rangle + \cdots$ 120 → $\text{Prob}\{|i\rangle\} \propto |\alpha_i|^2$ 130 → $\dfrac{\partial}{\partial t}|\psi(t)\rangle = -i\,H(t)\,|\psi(t)\rangle$ 140 → $|\psi(t)\rangle = U(t)\,|\psi(0)\rangle$ 150 → $U^{-1} = U^\dagger = (U^*)^T = (U^T)^*$ $$|0\rangle = \begin{bmatrix} 1 \\ 0 \end{bmatrix}, \qquad |1\rangle = \begin{bmatrix} 0 \\ 1 \end{bmatrix}$$

210

$$|\psi\rangle = \alpha|0\rangle + \beta|1\rangle = \begin{bmatrix} \alpha \\ \beta \end{bmatrix}, \qquad |\alpha|^2 + |\beta|^2 = 1, \qquad \alpha, \beta \in \mathbb{C}$$

$|\alpha|^2 =$ Probability of observing "0" when the qubit is measured $|\beta|^2 =$ Probability of observing "1" when the qubit is measured

$$\psi_{i_1,\ldots,i_n}$$

320

$$|i_1 \cdots i_n\rangle$$

330

$$|\psi\rangle = \sum_{i_1,\ldots,i_n \in \{0,1\}} \psi_{i_1,\ldots,i_n} |i_1 \cdots i_n\rangle$$

340

$$\psi'_{i_1,\ldots,i_n} = \sum_{p,q \in \{0,1\}} u_{i_k,i_m,p,q}\, \psi_{i_1,\ldots,i_{k-1},p,i_{k+1},\ldots,i_{m-1},q,i_{m+1},\ldots,i_n}$$

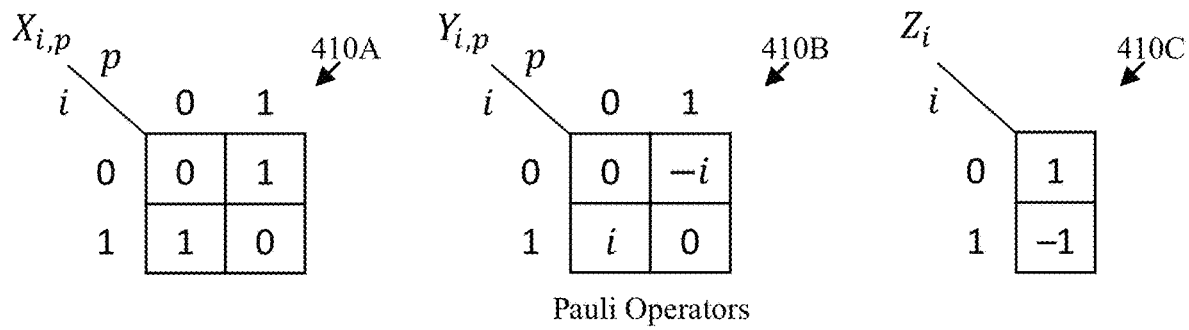
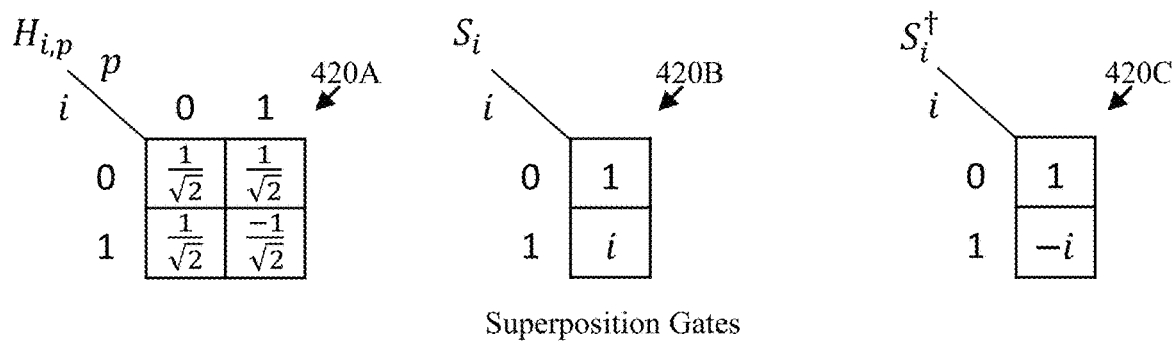
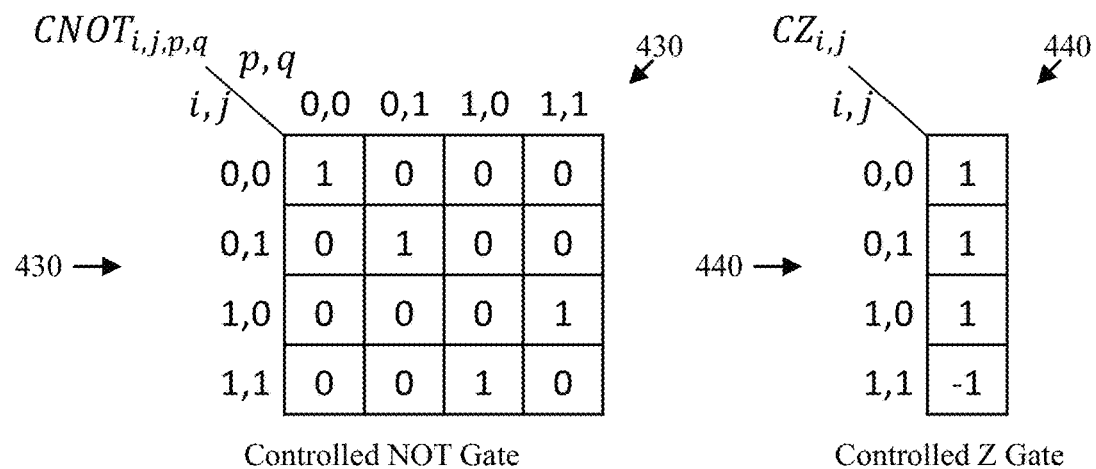
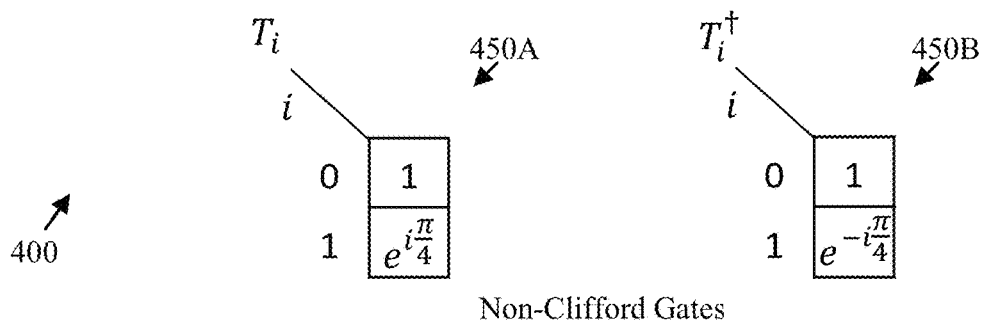
FIG. 4B

```
include
"qelib1.inc";
qreg q[2];
creg c[2];
660 → h q[0];
670A → x q[1];
680 → cx q[0],q[1];
670B → z q[0];
670C → y q[1];
```

$X$ applied to qubit $k$ out of $n$ qubits $$\psi'_{i_1,\ldots,i_n} = \sum_{p \in \{0,1\}} X_{i_k,p} \, \psi_{i_1,\ldots,i_{k-1},p,i_{k+1},\ldots,i_n}$$

$2^{n+1}$ complex multiplies, $2^n$ complex adds, $2^{n+4}$ bytes of memory $Y$ applied to qubit $k$ out of $n$ qubits $$\psi'_{i_1,\ldots,i_n} = \sum_{p \in \{0,1\}} Y_{i_k,p} \, \psi_{i_1,\ldots,i_{k-1},p,i_{k+1},\ldots,i_n}$$

$2^{n+1}$ complex multiplies, $2^n$ complex adds, $2^{n+4}$ bytes of memory $Z$ applied to qubit $k$ out of $n$ qubits $$\psi'_{i_1,\ldots,i_n} = Z_{i_k} \, \psi_{i_1,\ldots,i_{k-1},i_k,i_{k+1},\ldots,i_n}$$

$2^n$ complex multiplies, 0 complex adds, $2^{n+4}$ bytes of memory $H$ applied to qubit $k$ out of $n$ qubits $$\psi'_{i_1,\ldots,i_n} = \sum_{p \in \{0,1\}} H_{i_k,p} \, \psi_{i_1,\ldots,i_{k-1},p,i_{k+1},\ldots,i_n}$$

$2^{n+1}$ complex multiplies, $2^n$ complex adds, $2^{n+4}$ bytes of memory

FIG. 8A $S$ applied to qubit $k$ out of $n$ qubits $$\psi'_{i_1,\ldots,i_n} = S_{i_k} \psi_{i_1,\ldots,i_{k-1},i_k,i_{k+1},\ldots,i_n}$$

$2^n$ complex multiplies, 0 complex adds, $2^{n+4}$ bytes of memory $S^\dagger$ applied to qubit $k$ out of $n$ qubits $$\psi'_{i_1,\ldots,i_n} = S^\dagger_{i_k} \psi_{i_1,\ldots,i_{k-1},i_k,i_{k+1},\ldots,i_n}$$

$2^n$ complex multiplies, 0 complex adds, $2^{n+4}$ bytes of memory

CNOT applied to qubits $k, m$ out of $n$ qubits, $k < m$, where qubit $k$ controls qubit $m$ $$\psi'_{i_1,\ldots,i_n} = \sum_{p,q \in \{0,1\}} CNOT_{i_k,i_m,p,q} \, \psi_{i_1,\ldots,i_{k-1},p,i_{k+1},\ldots,i_{m-1},q,i_{m+1},\ldots,i_n}$$

$2^{n+2}$ complex multiplies, $3 \cdot 2^n$ complex adds, $2^{n+4}$ bytes of memory CZ applied to qubits $k$ and $m$ out of $n$ qubits, $k < m$ $$\psi'_{i_1,\ldots,i_n} = CZ_{i_k,i_m} \, \psi_{i_1,\ldots,i_{k-1},i_k,i_{k+1},\ldots,i_{m-1},i_m,i_{m+1},\ldots,i_n}$$

$2^n$ complex multiplies, 0 complex adds, $2^{n+4}$ bytes of memory

FIG. 8B $T$ applied to qubit $k$ out of $n$ qubits $$\psi'_{i_1,\ldots,i_n} = T_{i_k}\, \psi_{i_1,\ldots,i_{k-1},i_k,i_{k+1},\ldots,i_n}$$

$2^n$ complex multiplies, 0 complex adds, $2^{n+4}$ bytes of memory $T^\dagger$ applied to qubit $k$ out of $n$ qubits $$\psi'_{i_1,\ldots,i_n} = T^\dagger_{i_k}\, \psi_{i_1,\ldots,i_{k-1},i_k,i_{k+1},\ldots,i_n}$$

$2^n$ complex multiplies, 0 complex adds, $2^{n+4}$ bytes of memory

FIG. 8C $$\phi_{a,d} = \delta_a \delta_d$$

$$\psi_{c,g} = Z_c \sum_f Y_{g,f} \sum_{b,e} CNOT_{c,f,b,e} \sum_a H_{b,a} \sum_d X_{e,d} \phi_{a,d}$$

48 complex multiplies, 24 complex adds, 128 bytes of memory $$\varphi_b = \sum_a H_{b,a} \delta_a, \quad \phi_e = \sum_d X_{e,d} \delta_d$$

$$\psi_{c,g} = Z_c \sum_f Y_{g,f} \sum_{b,e} CNOT_{c,f,b,e} (\varphi_b \phi_e)$$

32 complex multiplies, 16 complex adds, 128 bytes of memory

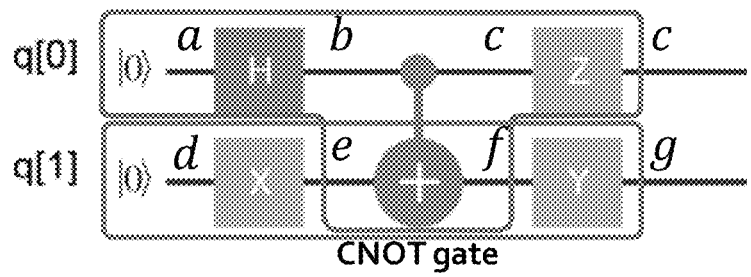

$$\varphi_{c,e,f} = Z_c \sum_b CNOT_{c,f,b,e} \sum_a H_{b,a}\delta_a$$

$$\phi_{e,f,g} = Y_{g,f} \sum_d X_{e,d}\delta_d$$

48 complex multiplies, 20 complex adds, and 320 bytes of memory $$\psi_{c,g} = \sum_{e,f} \varphi_{c,e,f}\phi_{e,f,g}$$

FIG. 9C

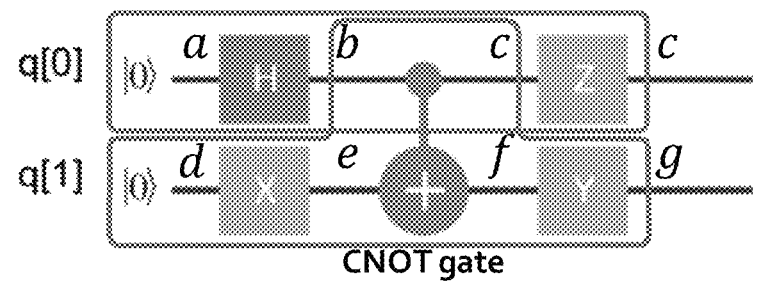

$$\varphi_{b,c} = Z_c \sum_a H_{b,a}\delta_a$$

42 multiplies, 20 adds, and 256 bytes of memory $$\phi_{b,c,g} = \sum_f Y_{g,f} \sum_e CNOT_{c,f,b,e} \sum_d X_{e,d}\delta_d$$

$$\psi_{c,g} = \sum_b \varphi_{b,c}\phi_{b,c,g}$$

Indices that are shared between two or more circuit partitions are referred to as *entangled indices*, in this case *b* and *c*

FIG. 9D $$\varphi_{b,f,g} = Y_{g,f} \sum_a H_{b,a} \delta_a$$

$$\phi_{b,c,f,g} = Z_c \sum_e CNOT_{c,f,b,e} \sum_d X_{e,d} \delta_d$$

$$\psi_{c,g} = \sum_{b,f} \varphi_{b,f,g} \phi_{b,c,f,g}$$

56 complex multiplies, 20 complex adds, 448 bytes of memory

SIMULATING QUANTUM CIRCUITS

BACKGROUND OF THE INVENTION

The present invention relates generally to quantum circuits, and more particularly to simulating quantum circuits.

Quantum circuits make direct use of quantum-mechanical phenomena, such as superposition and enablement, to process information. For example, a quantum circuit may comprise quantum gates that apply logical functions to various inputs. In contrast to digital logic circuits which are limited to definite states (e.g., 0 and 1) for each circuit element, quantum circuits can represent and process multiple states simultaneously (via superposition). Consequently, quantum computing may be able to solve some problems much faster than conventional computing and also solve problems that are currently too complex for conventional computing.

Despite the promise of quantum computing, quantum circuits are difficult to build, expensive, and suffer from various issues such as scaling and quantum de-coherence. Consequently, there is a need to be able to simulate relatively large quantum circuits using commercially available computers. Furthermore, there is also a need to compare the actual outputs of a quantum computing device to the ideal behavior predicted by simulation for a quantum circuit being implemented in order to assess the fidelity with which a quantum device is able to execute a desired quantum circuit.

SUMMARY

In one aspect of the embodiments disclosed herein, a method, executed by one or more processors, for simulating a quantum circuit comprising a plurality of quantum gates, includes receiving a digital description of the quantum circuit, partitioning the digital description of the quantum circuit into a plurality of quantum sub-circuits wherein each quantum sub-circuit of the plurality of quantum sub-circuits comprises one or more quantum gates, determining sub-circuit dependencies for the plurality of quantum sub-circuits, simulating the plurality of quantum sub-circuits according to the sub-circuit dependencies to produce simulation results for each quantum sub-circuit of the plurality of quantum sub-circuits, wherein a first and a second quantum sub-circuit of the plurality of quantum sub-circuits each contain one or more gates that are applied to a common qubit, and wherein the first and the second quantum sub-circuit are simulated independently using an entangled tensor index. A corresponding computer system and computer program product are also disclosed herein.

In one aspect of the embodiments disclosed herein, a method, executed by one or more processors, for simulating a quantum circuit comprising a plurality of quantum gates, receiving a digital description of the quantum circuit comprising a plurality of stages, reating a sub-circuit for each initial stage qubit to produce a plurality of sub-circuits, iteratively adding connected non-bridging gates from one or more subsequent stages of the plurality of stages to the plurality of sub-circuits until no more connected non-bridging gates are available, selecting a bridging gate that is connected to two or more sub-circuits of the plurality of sub-circuits, determining whether to entangle the two or more sub-circuits, and adding the bridging gate to only one of the two or more sub-circuits responsive to determining to entangle the two or more sub-circuits A corresponding computer system and computer program product are also disclosed herein.

In one aspect of the embodiments disclosed herein, a method, executed by one or more processors, for simulating a quantum circuit comprising a plurality of quantum gates, includes receiving a digital description of a set of quantum sub-circuits comprising quantum gates and corresponding qubits, assigning a distinct tensor index to each qubit and to an output of every non-diagonal unitary gate, propagating an tensor index variable from an input to an output of each diagonal unitary gate, and executing each quantum sub-circuit using the assigned tensor indices. A corresponding computer system and computer program product are also disclosed herein.

BRIEF DESCRIPTION OF THE DRAWINGS

FIG. 2 is a set of equations depicting one example of basis vectors corresponding to a qubit in accordance with at least one embodiment of the present invention;

FIG. 3 is a set of equations depicting two examples of a tensor representation of a quantum system in accordance with at least one embodiment of the present invention;

FIG. 4A is a set of schematic symbols and FIG. 4B is a corresponding set of tensor tables depicting various examples of quantum gates in accordance with at least one embodiment of the present invention;

FIGS. 8A-8C are text diagrams depicting tensor equations and resource costs associated with simulating various quantum gates depicted in FIGS. 4 and 5;

FIGS. 9A-9E are schematic and equation diagrams depicting the effect of partitioning on the computing resources needed to simulate one particular example of a quantum circuit in accordance with at least one embodiment of the present invention;

DETAILED DESCRIPTION

Figure 1:
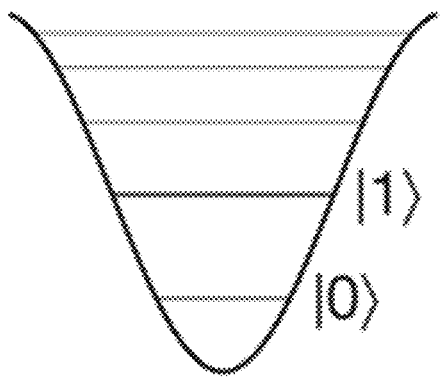
FIG. 1 is an illustration and associated equations depicting one example of quantum states in accordance with at least one embodiment of the present invention.

The following terms, definitions, and concepts, which are distilled from publicly available sources such as Wikipedia, as well as the working knowledge of the inventors, may be helpful in understanding the present invention—particularly to those that are not skilled in the art of simulating quantum circuits.

Quantum Superposition: The net response (e.g., in a circuit element) caused by two or more stimuli simultaneously is the sum of the responses that would have been caused by each stimulus individually. In the case of a quantum system, the response is a quantum state that can be a linear superposition of discrete states. Superposition thereby enables quantum circuits to represent multiple states or outcomes (e.g., a statistical mix of 0 and 1) simultaneously.

Quantum System: A system that exhibits quantum effects such as superposition and entanglement.

Quantum States: The states (possibilities) that are (simultaneously) present or available in a quantum system.

Qubit: A unit of quantum storage that can represent a statistical mix of a 0 state and a 1 state simultaneously.

Quantum collapse: The act of measuring the state of a quantum mechanical system that causes the system to evolve to a single measured state. In a real quantum mechanical system, the act of measuring essentially selects a single realized value from a statistical mix of values. However, in a simulated quantum circuit, measurements can be made without destroying the underlying state information.

Entanglement: An effect present between two quantum systems whose quantum mechanical states are interdependent. For example, measuring the state of one of two entangled qubits will tell you information about the state of the other entangled qubit because their states are statistically correlated.

Quantum data: Information represented as one or more quantum states (e.g., within a quantum circuit element such as a qubit).

Quantum gate: An element of a quantum circuit used to perform a logical or mathematical function on quantum data. Examples of quantum gates are shown in FIGS. 4 and 5.

Tensor: A k-dimensional array of real or complex values where k is the rank or order of the tensor. A matrix is a second order tensor and a vector is a first order tensor. Tensors may be used to represent quantum states in a quantum simulation.

Tensor network: A directed graph that corresponds to a set of interrelated tensor equations. A tensor network can be used to represent a quantum circuit where the nodes in the graph are tensors representing quantum circuit elements (e.g., quantum gates) and the edges of the graph may indicate indexing variables for the tensors.

Tensor contraction: A mathematically rigorous process of merging a series of two or more interrelated tensors into a single tensor. Tensor contraction may or may not multiplicatively increase the size of the resulting tensor depending on the relationship of the indexing variables of the merged tensors. When a quantum circuit is represented as a tensor network, tensor contraction merges two or more nodes connected by one or more edges into a single node.

As used herein, the terms "simulate" and "execute" (e.g., a quantum sub-circuit) are essentially synonymous in that (in contrast to many simulations which are mere approximations of something real) the quantum circuit simulation methods disclosed herein yield real, computationally valid, results. As used herein, the phrase "index variable" or the like refers to any type of memory addressing or indexing (such as those known to one of skill in the art) that results in accessing the desired data and/or memory location.

At least some of the embodiments disclosed herein recognize that quantum circuits may be simulated using less memory than conventionally assumed. For example, at least some of the embodiments disclosed herein reduce the memory required to represent and simulate quantum circuits comprising N qubits from $2^N$ complex values to a fraction of that quantity.

Specifically, at least some of the embodiments disclosed herein recognize that a quantum circuit may be partitioned into sub-circuits by having entangled quantum circuit elements in two or more of the sub-circuits. At least some of the embodiments disclosed herein further recognize that the simulation results of some sub-circuits may be calculated in slices and by so doing the working memory required to simulate the overall quantum circuit, contrary to conventional expectations, can be significantly reduced. One of the inventive insights of the present invention is that these slicing operations can be performed during the simulation of a quantum circuit as soon as a point is reached in the simulation where all remaining quantum gates that are applied to a qubit are diagonal-unitary gates. In such a circumstance, a iterative construct such as a for-loop can be introduced to iterate over the 0/1 values of the qubit and subsequent tensor operations involving that qubit can be performed in slices using half the amount of working memory than without employing tensor slicing.

It should be noted that references throughout this specification to features, insights, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, insights, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages will become more fully apparent from the following drawings, description and appended claims, or may be learned by the practice of the invention as set forth hereinafter.

FIG. 1 is an illustration and associated equations depicting one example of quantum states in accordance with at least one embodiment of the present invention. Particles, such as electrons, that are bound to other particles, such as atoms, are restricted to discrete (i.e., quantized) oscillatory energy levels referred to as quantum states. In Dirac notation (a.k.a. braket notation), these states are designated as $|0\rangle$, $|1\rangle$, $|2\rangle$, $|3\rangle$ etc. where $|0\rangle$ corresponds to the lowest energy level which is known as the ground state.

Quantum computers manipulate the states of quantum systems in order to perform calculations and solve problems. Typically, only the two lowest energy states are used which results in a unit of computation and storage known as a qubit. Since manipulation and access to individual electrons is problematic, qubits of quantum computers are typically embodied as superconducting oscillators. Examples include transmon qubits, which are semiconductor devices that combine capacitors with superconducting Josephson junctions that effectively function as non-linear inductors and facilitate circuit resonance.

As shown in equation 110, the primary oscillatory states of a quantum system can be represented as basis vectors within an n-dimensional vector space. An arbitrary quantum state of a quantum system can then be represented as a linear combination (i.e., superposition) of these basis vectors with a complex scalar multiplier $\alpha_i$ for each basis dimension in the vector space. Equation 120 shows that when a measurement is made, the quantum system collapses to one of the primary oscillatory states where the probability is proportional to the square magnitude of the scalar multiplier $\alpha_i$ (a.k.a., complex amplitude or, simply, amplitude) for that oscillatory state immediately before measurement.

As shown in equation 130, the time evolution of a particular quantum state is governed by Schrödinger's equation. The term H(t) is known as the Hamiltonian and corresponds to the total energy in the system. It can be represented by a matrix that defines a linear transformation of the scalar multipliers $\alpha_i$. As shown in equation 140, solutions to Schrödinger's equation have the form $|\psi(t)\rangle = U(t)|\psi(0)\rangle$ where U(t) can be represented as a unitary matrix that also defines a linear transformation of the scalar multipliers $\alpha_i$. However, whereas Hamiltonian matrices correspond to the total energies of quantum systems, the unitary matrices that appear in solutions to Schrödinger's equation correspond to the time evolutions of quantum systems.

Equation 150 shows that unitary matrices have the property that their inverses are equal to the transposes of their complex conjugates. This property reflects the fact that the time evolutions of quantum systems are reversible until measurements are made (i.e., any action done can be undone via reverse actions). Measurements are non-reversible actions that induce non-unitary transformations.

FIG. 2 is a set of equations depicting one example of basis vectors corresponding to a qubit in accordance with at least one embodiment of the present invention. As shown in FIG. 2, the principal quantum states of a qubit, namely $|0\rangle$ and $|1\rangle$, can each be represented by a basis vector of length 2 comprising binary entries indicating that the system is exclusively in one principal quantum state or the other. As shown in equation 210, any quantum state (i.e., $|\psi\rangle$) of a qubit can be represented as a linear combination of the $|0\rangle$ and $|1\rangle$ basis states (i.e., by the scalar multipliers of those basis states). In the depicted equation, the scalar multipliers (i.e., amplitudes) for the $|0\rangle$ and $|1\rangle$ basis states are the Greek letters alpha ($\alpha$) and beta ($\beta$) respectively. Consequently, the probability of a measured qubit collapsing to a $|0\rangle$ state is $|\alpha|^2$ and the probability of a measured qubit collapsing to a $|1\rangle$ state is $|\beta|^2$.

FIG. 3 is a set of equations depicting two examples of a tensor representation of a quantum system in accordance with at least one embodiment of the present invention. Instead of the more common Dirac notation, a quantum system comprising n qubits can be represented as an n-dimensional array (i.e., a tensor) as introduced by Markov and Shi. Specifically, a tensor 310 represented herein with the Greek letter psi ($\psi$) with n indexing subscripts ($i_1 \ldots i_n$) can be used to represent the quantum state of n qubits where the probability of observing a collapsed or measured value is determined by the complex scalar amplitude $\psi$ associated with the basis state 320 represented as $|i_1 \ldots i_n\rangle$. Each indexing subscript ($i_1 \ldots i_n$) of the basis state 320 is a binary value when the quantum system is collapsed or measured.

The relationship between the tensor representation of a quantum state and the Dirac representation is shown in equation 330. The quantum state in the Dirac representation is a linear combination of the $|0 \cdots 0\rangle, \ldots, |1 \cdots 1\rangle$ basis states, where the values of the corresponding quantum state tensor are the complex scalar multipliers that define this linear combination. The tensor values in equation 330 thus play the same role as the Greek letters alpha ($\alpha$) and beta ($\beta$) in equation 210.

A complete tensor equation for another example quantum system (i.e., a quantum circuit) is shown in equation 340. In the depicted example, a two-qubit gate is being applied to qubits k and m, k<m, in a quantum circuit comprising n qubits that is initially in quantum state $\psi$. Equation 340 expresses the value of the tensor for the resulting quantum state $\psi'$ in terms of the initial quantum state $\psi$ and the tensor u that corresponds to the unitary linear transformation defined by the two-qubit gate. The equivalent equation in Dirac notation would be significantly more complex, requiring the 4-dimensional gate tensor u to be expanded out into an $2^n$-by-$2^n$ dimensional matrix with each of the 16 values of u replicated $2^{(n-4)}$ times in the correct combinations of rows and columns of this matrix. Unless k=m−1, the equivalent equation in Dirac notation would be quite messy whereas it is easily expressed using tensor notation.

Figure 4A:
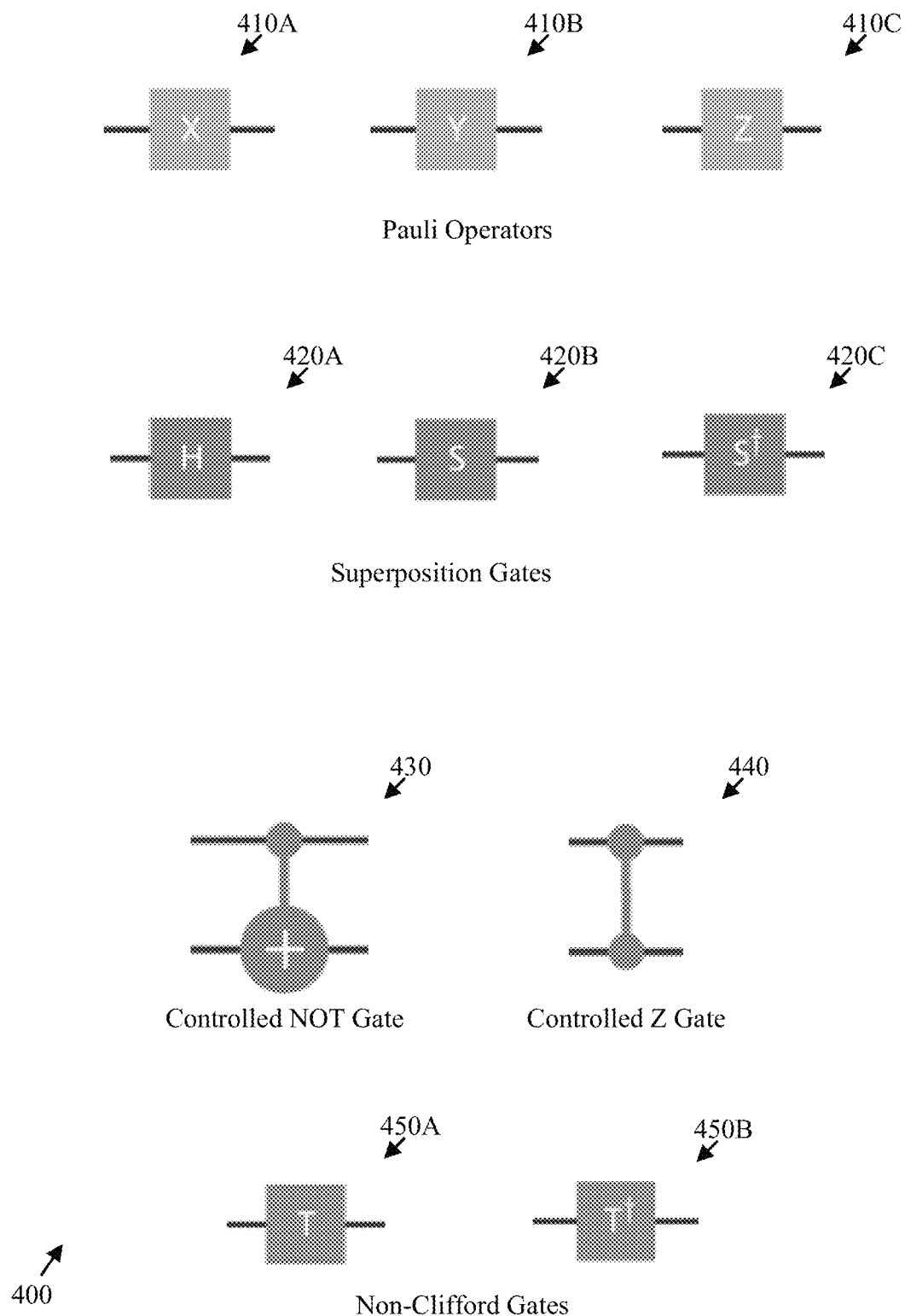
Figure 5:
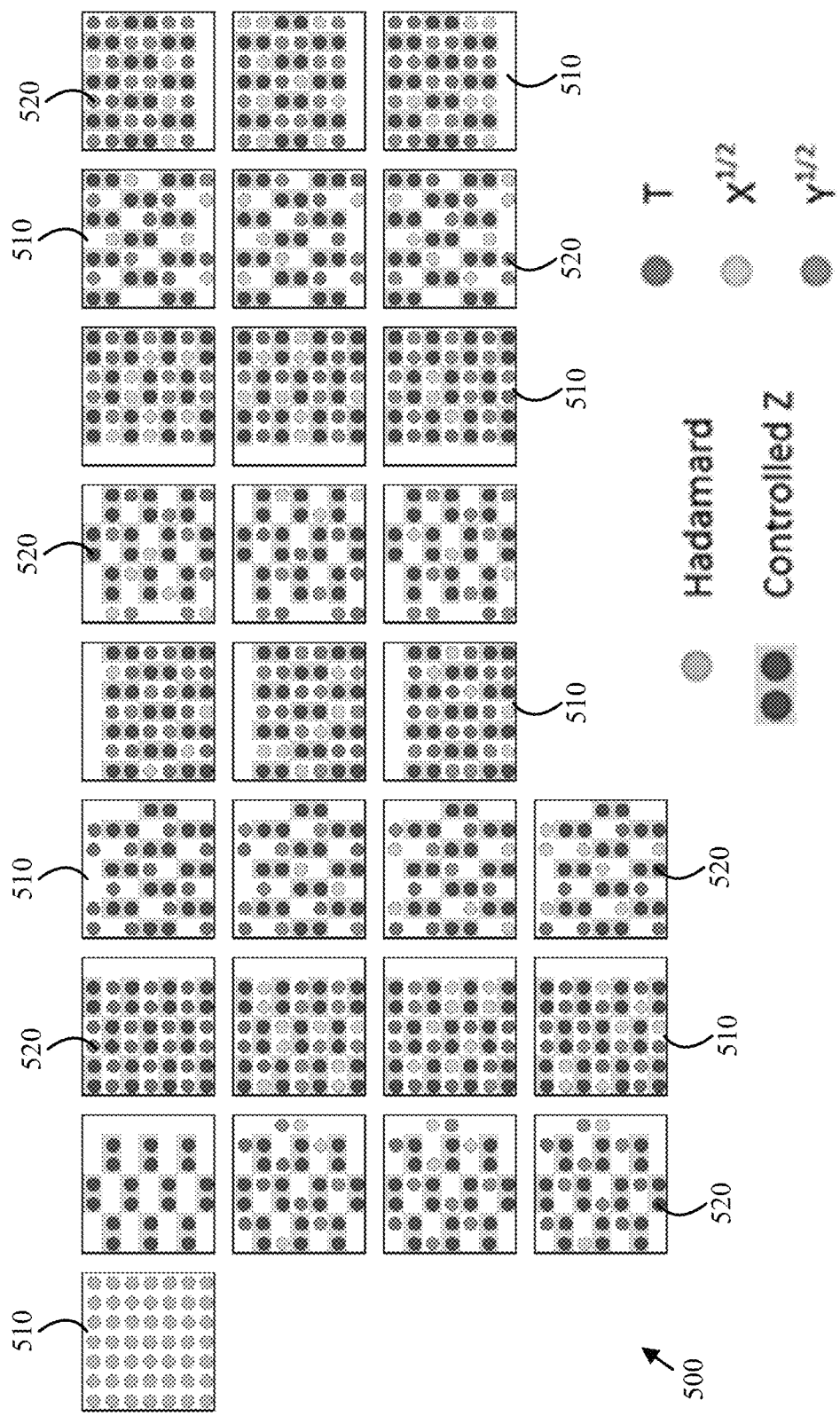
FIG. 5 is an execution plan corresponding to a large quantum circuit that is conventionally assumed to be impossible to simulate on currently available computing systems.

FIG. 4A is a set of schematic symbols and FIG. 4B is a corresponding set of tensor tables depicting various examples of quantum gates in accordance with at least one embodiment of the present invention. The depicted quantum gates include Pauli gates 410, superposition gates 420, a controlled NOT gate 430, a controlled Z gate 440, and non-Clifford gates 450. The depicted quantum gates are non-exhaustive examples of gates that can be used in quantum computing systems.

The Pauli gates 410 correspond to the Pauli equation which takes into account the interaction of the spin of a particle with an external electromagnetic field. The superposition gates 420 include a Hadamard gate 420A, and S and $S^\dagger$ gates 420B and 420C, respectively. The Hadamard gate 420A maps the $|0\rangle$ and $|1\rangle$ principal (exclusive) basis states to states that are halfway between $|0\rangle$ and $|1\rangle$, namely $(|0\rangle+|1\rangle)/\sqrt{2}$ and $(|0\rangle-|1\rangle)/\sqrt{2}$, respectively, resulting in equal probability for the $|0\rangle$ and $|0\rangle$ basis states. The S and $S^\dagger$ gates 420B and 420C, respectively, are sometimes used to add 90° phase rotations to superpositions.

Controlled gates act on two or more qubits, where one or more qubits act as a control for a particular operation. With the controlled Z (CZ) gate 440, one of the qubits determines whether a Pauli Z operation is applied to the other qubit. The action of a CZ gate is completely symmetrical in the sense the results are the same independent of which qubit is the control. With the controlled NOT (CNOT) gate 430, one of the qubits determines whether a Pauli X operation is applied the other qubit causing the other qubit to be NOT'd (flipped). The CNOT gate 430 and the CZ gate 440 can both be used to entangle and disentangle qubits. The classical analog to a CNOT gate is a reversible XOR gate.

Non-Clifford gates are used to approximate arbitrary unitary transformations. The depicted non-Clifford T and $T^\dagger$ gates 450A and 450B, respectively, add 45° phase rotations. Whereas Clifford gates 410 through 440 permit only finite numbers of distinct unitary transformations to be realized, the addition of T and T† gates expands this set to infinity, enabling any unitary transformation to be approximated to arbitrary accuracy through appropriate combinations of these gates. Universal quantum computing relies on this capability.

Those skilled in the art of quantum computing will recognize that Z, S, S†, CZ, T, and T† gates are diagonal-unitary gates, which is to say that their Dirac matrix representations are diagonal, with the off-diagonal terms being zero. The tensor representations of diagonal-unitary gates, on the other hand, need only reflect these diagonal terms, as shown in FIG. 4B.

FIG. 5 is an execution plan 500 corresponding to a large quantum circuit that is conventionally assumed to be impossible to simulate on currently available classical computing systems. As depicted, the execution plan 500 includes a number of tiles 510 with gate symbols 520 contained therein. Each tile 510 corresponds to a stage or time-step and the gate symbols 520 indicate the function (transformation) performed on one or more qubits during the indicated stage or time-step. In the depicted embodiment, the execution plan 500 is executed row-by-row from top to bottom and tile-by-tile from left to right within each row. One of skill in the art will appreciate that each tile corresponds to an 7×7 array of qubits and that $2^{49}$ memory values are required to represent all possible states of 49 qubits. Therefore, when using two 8 byte floating point values to store (complex) qubit state information $2^{53}$ bytes (8 petabytes) of memory are required to guarantee simulation of the depicted execution plan using conventional simulation techniques.

Figure 6:
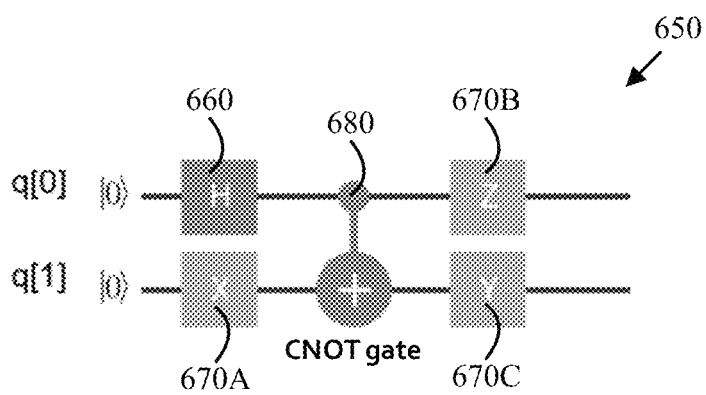
FIG. 6 is a schematic diagram and corresponding text-based logical description of a quantum circuit used herein as a processing example in accordance with at least one embodiment of the present invention.

FIG. 6 is a schematic diagram and corresponding text-based description of a quantum circuit 650 used herein as a processing example in accordance with at least one embodiment of the present invention. The quantum gates specified in the quantum circuit 650 include a Hadamard gate 660, an X Pauli gate 670A, a Y Pauli gate 670B, a Z Pauli gate 670C, and a CNOT gate 680. The depicted text-based description conforms to the OpenQASM specification and indicates which gates operate on specific qubits. The specified functions and gates are assumed to be in stage/time-step order. Consequently, the depicted text-based description is extremely compact.

Figure 7:
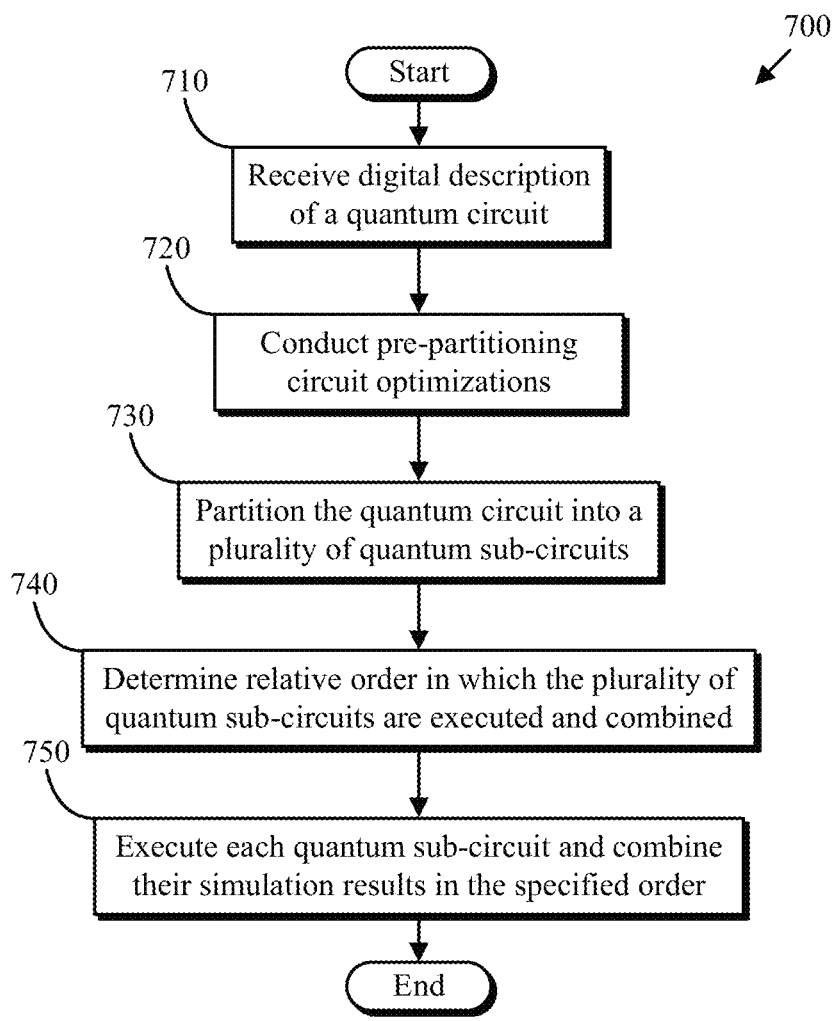
FIG. 7 is a flowchart depicting one example of a quantum circuit simulation method in accordance with at least one embodiment of the present invention.

FIG. 7 is a flowchart depicting one example of a quantum circuit simulation method 700 in accordance with at least one embodiment of the present invention. As depicted, the quantum circuit simulation method 700 includes receiving (710) a digital description of a quantum circuit, conducting (720) pre-partitioning optimizations, partitioning (730) the quantum circuit into sub-circuits, determining (740) an execution order and executing (750) the quantum circuit. The quantum circuit simulation method 700 may be executed by a computer such as the computer 1500 depicted in FIG. 15 and enables simulation of quantum circuits on one or more conventional computers and associated storage devices.

Receiving (710) a digital description of a quantum circuit may include receiving a text-based or binary description of the quantum circuit. The description may indicate the quantum gates included in the circuit and the dependencies between gates. In one embodiment, the digital description conforms to the OpenQASM specification.

Conducting (720) pre-partitioning optimizations may include making gate substitutions (e.g., circuit rewriting) that reduce the resources required to execute the quantum circuit. The circuit rewrites may also include performing gate substitutions in final stages of a quantum circuit that replace non-diagonal unitary gates with chains of diagonal-unitary gates leading from the end of a circuit inward for some qubits. Such circuit rewrites enable tensor slicing to be performed earlier in a circuit to further reduce memory requirements than without such rewrites. Circuit rewrites may also include gate substitutions that shift multiqubit gates to later stages of a circuit. Such circuit rewrites may defer the growth of memory requirements until later in a circuit and may increase the opportunity for additional tensor slicing to be applied to even further reduce the memory requirements needed to simulate quantum circuits.

Partitioning (730) the quantum circuit into sub-circuits may include estimating the resource cost of a number of possible partitions (heuristically or exhaustively) and selecting the partitioning with the lowest resource cost. In some embodiments, estimating and selecting is conducted recursively. In certain embodiments, each input qubit is assigned to a separate sub-circuit and the sub-circuits compete to consume subsequent stage gates to which they are connected. In some embodiments, a gate dependency graph is used to (at least initially) partition the quantum circuit into single qubit and multiple qubit sub-circuits.

Determining (740) an execution order may include using dependency information to determine an execution order for the sub-circuits. In some embodiments, the execution order is determined by creating an execution plan similar to FIG. 5 and comparing the stage or time-step of the first gate in each of the sub-circuits.

Executing (750) the quantum circuit may include executing each sub-circuit according to the execution order. In some embodiments, multiple processors are used and each available processor requests a next non-executed sub-circuit from an execution controller. In other embodiments, a process is spawned for each sub-circuit and the priority level of the processes are assigned in reverse of the execution order so that earlier stage sub-circuits are assigned a higher priority level. In some embodiments, simulations of sub-circuits are performed in a parallel distributed fashion across multiple processors; for example, using high-performance computing techniques. In some embodiments, simulation calculations are performed on graphics processing units.

FIGS. 8A-8C are text diagrams depicting tensor equations and resource costs associated with simulating various quantum gates depicted in FIGS. 4 and 5. As is shown, the resource cost associated with updating qubits according to the depicted tensor equations is dependent on the particular function as well as the number of qubits used to retain state information in a quantum system. For example, a Hadamard gate applied to two qubits in a quantum system of n qubits will require $2^{(n+1)}$ complex multiplies, $2^n$ complex adds, and $2^{(n+4)}$ bytes of memory. In contrast, a controlled Z gate will require the same number of bytes of memory but will require half the number of complex multiplies and zero complex adds. This same property holds true for all diagonal-unitary gates, include Z, S, S†, CZ, T, and T† gates. Further reductions in the number of operations per gate can be achieved by implementing specialized code for each gate to exploit the fact that multiplication by zero or by one can be avoided, and that multiplication by −1 is simply a sign change. Similarly, multiplication of a complex number by a purely real or a purely imaginary coefficient requires only two floating-point multiplications and no additions instead of the usual four multiplications and two additions. In some embodiments, the present invention leverages knowledge of resource costs to compare options in the quantum circuit simulation process.

FIGS. 9A-9E are schematic and equation diagrams depicting the effect of partitioning on the computing resources needed to simulate one particular example of a quantum circuit in accordance with at least one embodiment of the present invention.

Figure 9A:
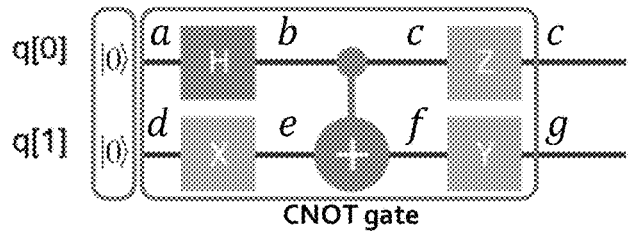

FIG. 9A depicts a circuit portioning that reflects a conventional method for simulating quantum circuits in which a data structure holding the quantum state of all qubits in the circuit is first constructed and initialized, and this data structure is then updated by simulating the effects of each gate executed in input-to-output order. This conventional method corresponds to a circuit partitioning in which the initial states of the qubits are placed together in one sub-circuit and the gates are placed together in a second sub-circuit as illustrated. The equations depicted in FIG. 9A reflect the calculations that are performed using this approach. An initial state tensor ϕ is first constructed and initialized, where the initialization employs the Kronecker delta tensor $$\delta_i = \begin{cases} 1 & i = 0 \\ 0 & i \neq 0 \end{cases}$$

which is the tensor equivalent of the Dirac quantum ground state |0⟩:

$$|0\rangle = \begin{bmatrix} 1 \\ 0 \end{bmatrix}.$$

A final state tensor ψ is then calculated from the initial state tensor ϕ by applying the equations shown in FIG. 8 in input-to-output order.

Figure 9B:
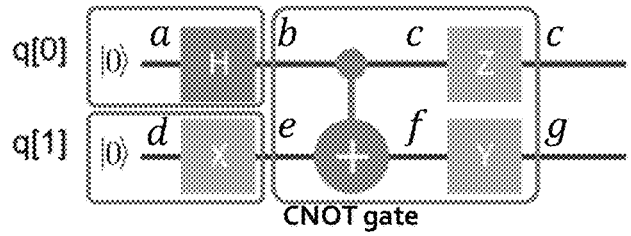

FIG. 9B depicts a slightly more sophisticated style of circuit partitioning that is known in the prior art in which qubits q[0] and q[1] are simulated independently to the extent possible until a multiqubit gate is encountered that must be applied to both qubits. The conventional approach in such a situation is to then combine the results of the independent simulations of q[0] and q[1], and finally to apply the remaining gates to the resulting combined state to yield the final quantum state. The equations depicted in FIG. 9B correspond precisely to this simulation approach.

Figure 9E:
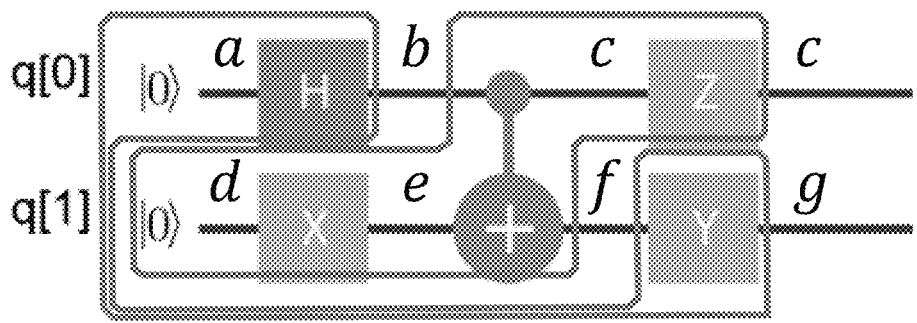

FIGS. 9C, 9D, and 9E illustrate an inventive insight of the present invention, which is that by employing tensor representations of quantum gates, the laws of algebra then enable one to arbitrarily partition sets of gates into sub-circuits, simulate each sub-circuit, and combine their results to produce mathematically identical calculations of final quantum states of circuits. FIGS. 9C and 9D illustrate two partitionings in which the effects of gates on qubits q[0] and q[1] are first simulated independently and their results are then combined. In FIG. 9C, the simulation of the CNOT gate—which is applied to both qubits and which thereby entangles them—is assigned to the top sub-circuit that corresponds to the simulation of qubit q[0], while in FIG. 9D the CNOT gate is assigned to the bottom sub-circuit.

Up until now, the conventional wisdom in quantum circuit simulation has been that once qubits are entangled via the application of a multiqubit gate such as a CNOT gate, the entangled qubits must be simulated together. Stated another way, conventional wisdom holds that two sub-circuits cannot be simulated independently if those sub-circuits contain gates that apply to the same qubit, especially if those two sub-circuits overlap temporally in their execution plans (i.e., if the two sub-circuits have overlapping execution stages), meaning that all of the gates in one sub-circuit do not strictly precede nor follow all of the gates in the other sub-circuit, but instead the sequencing of the gates of the two sub-circuits overlap within the circuit as a whole. Nevertheless, FIGS. 9C and 9D illustrate the contrary—the equations shown in FIGS. 9C and 9D produce mathematically identical results with respect to each other and with respect to the equations shown in FIGS. 9A and 9B, despite the apparent violation of conventional wisdom.

The enabling insight that permits simulations to be performed in this manner is the idea of an entangled index as illustrated in FIG. 9D. An entangled index is a tensor index (e.g., a variable) that is shared between gate tensors in two distinct sub-circuits. In FIG. 9D, b and c are entangled indices. In FIG. 9C, e and f are entangled indices. These entangled indices provide the mathematical bookkeeping needed to enable sub-circuits that contain gates that are applied to the same qubit to be simulated independently and to have their results combined in mathematically correct fashions.

In principle, gates in a quantum circuit can be partitioned arbitrarily using this insight, as illustrated in FIG. 9E. However, in preferred embodiments of the present invention, sub-circuits are constructed with the goal of achieving net reductions in resource costs for the overall simulations.

Figure 10:
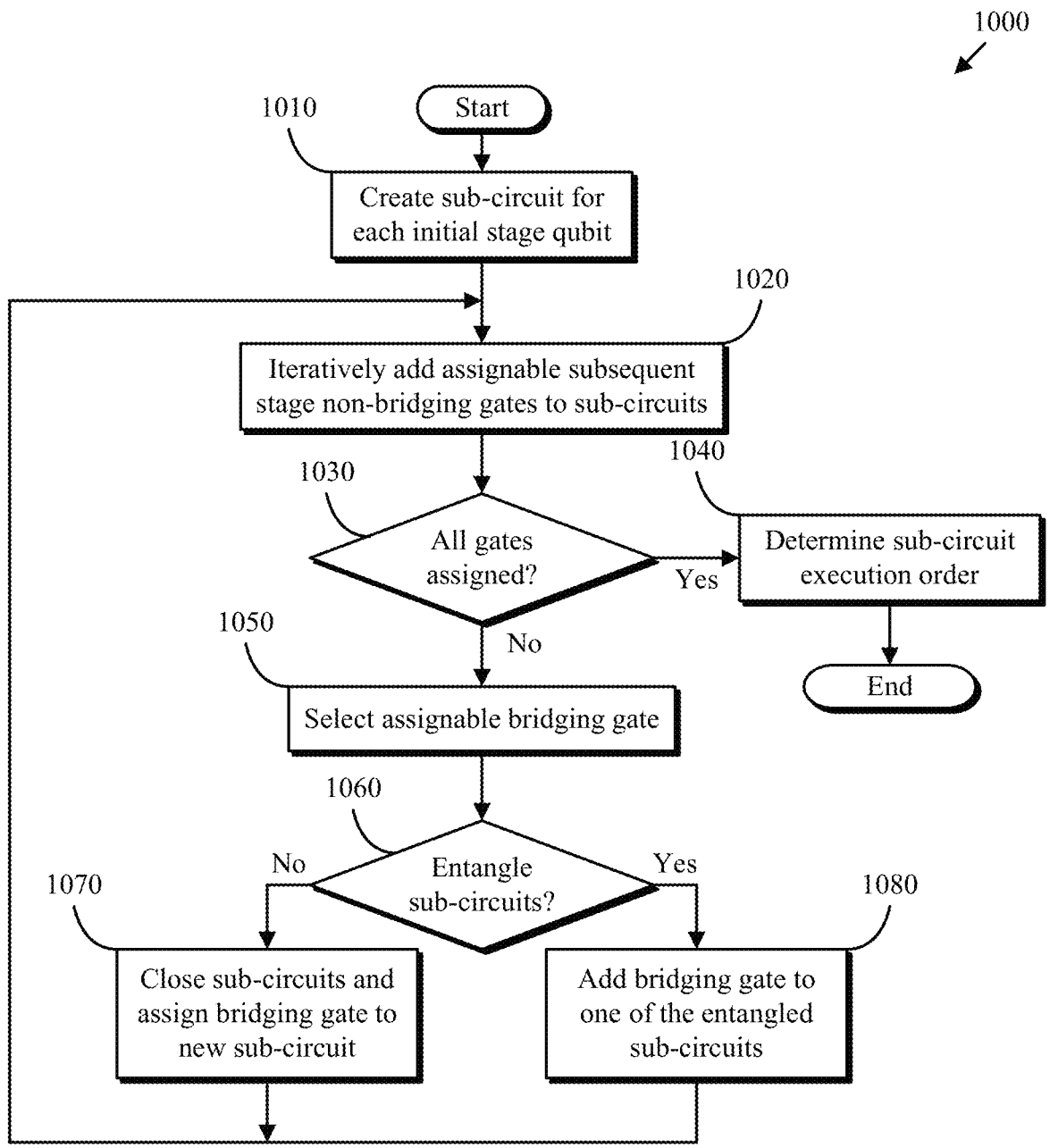
FIG. 10 is a flowchart depicting one example of a quantum circuit partitioning method in accordance with at least one embodiment of the present invention.

FIG. 10 is a flowchart depicting one example of a quantum circuit partitioning method 1000 in accordance with at least one embodiment of the present invention. As depicted, the quantum circuit partitioning method 1000 includes creating (1010) a sub-circuit for each initial stage qubit, adding (1020) subsequent stage gates to sub-circuits, determining (1030) whether all gates have been assigned, determining (1040) an execution order, selecting (1050) a bridging gate, determining (1060) whether to entangle the bridged sub-circuits, and closing (1070) the bridged sub-circuits or adding (1080) the bridging gate to one of the entangled sub-circuits. The quantum circuit partitioning method 1000 is one example of at least the partitioning operation 730 shown in FIG. 7 and may be executed by a computer such as the computer 1500 depicted in FIG. 15. The quantum circuit partitioning method 1000 enables partitioning of a quantum circuit in a manner that can reduce or minimize the resources required to simulate the quantum circuit using a conventional computer and associated storage.

Creating (1010) a sub-circuit for each initial stage qubit may include determining the number of qubits (at least initially) required by a quantum circuit and initializing a data structure for defining a sub-circuit for each of the qubits required by the quantum circuit. Adding (1020) subsequent stage gates to sub-circuits may include adding to each sub-circuit unassigned next stage gates that only require input from qubits that are currently assigned to the sub-circuit. This adding step may also include determining whether all remaining unassigned gates for a qubit assigned to a sub-circuit are diagonal-unitary gates and, if so, closing that sub-circuit, creating a new sub-circuit with the same assigned qubits as the closed sub-circuit, and marking this new sub-circuit as having been created for the purpose of slicing the assigned qubit(s) for which all remaining unassigned gates are diagonal-unitary gates. Closing a sub-circuit may include marking the sub-circuit as complete in order to prevent the addition of other gates to the sub-circuit.

Determining (1030) whether all gates have been assigned may include determining whether an unassigned gate count, or some other indicator, indicates that all gates have been assigned to a sub-circuit. Determining (1040) an execution order may include conducting the determining operation 740 described in conjunction with FIG. 7.

Selecting (1050) a bridging gate may include selecting an unassigned next stage gate that requires input from at least one qubit that is currently assigned to a sub-circuit as well as one or more qubits that are not currently assigned to the sub-circuit. In other words, a bridging gate is a gate that requires input from multiple sub-circuits as currently created.

Determining (1060) whether to entangle the bridged sub-circuits may include estimating the resource costs of alternative scenarios in which a decision is made to entangle the bridged sub-circuits versus not entangle, comparing the resources costs associated with each decision, and then choosing the lowest-cost alternative.

Closing (1070) the bridged sub-circuits may include marking the sub-circuits as complete in order to prevent the addition of other gates to the bridged sub-circuits. Assigning (1070) the bridging gate to a new sub-circuit may include creating a new sub-circuit, assigning the qubits of the bridged sub-circuits that were closed to this new sub-circuit, and then assigning the bridging gate to this new sub-circuit.

Figure 12A:
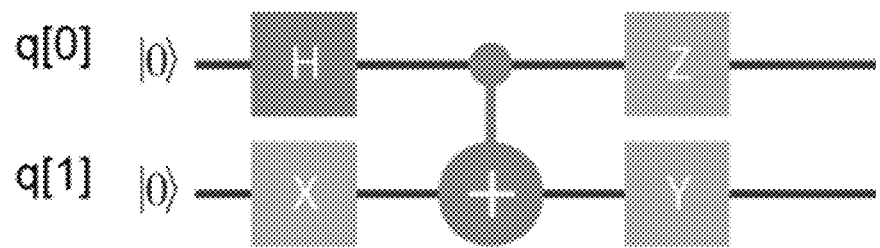
FIGS. 12A-12C are schematic diagrams depicting one example of pre-partitioning optimization of one particular example of a quantum circuit.
Figure 12B:

Adding (1080) the bridging gate to one of the entangled sub-circuits may include adding the bridging gate to a list of gates included in the sub-circuit. This adding step may also include first replacing the bridging gate with an equivalent combination of gates in which the new bridging gate becomes diagonal-unitary. An example is the replacement of a CNOT gate with a combination of a CZ gate and Hadamard gates as illustrated in FIG. 12B in order to replace the CNOT gate shown in FIG. 12A with this equivalent combination of gates as shown in FIG. 12D. When such a substitution is made, the new bridging gate is assigned to one of the bridged sub-circuits and any single-qubit gates that might have been introduced in this rewrite are assigned to sub-circuits in accordance with the qubits that are assigned to those sub-circuits. For example, in the particular case of replacing a CNOT gate with a CZ gate, the Hadamard gates that are introduced are assigned to the sub-circuit to which the corresponding qubit is assigned in order to conform with the rules for adding subsequent stage gates to sub-circuits described above in connection with step 1020. The CZ gate, on the other hand, can be assigned to either of the sub-circuits being entangled.

Figure 11A:
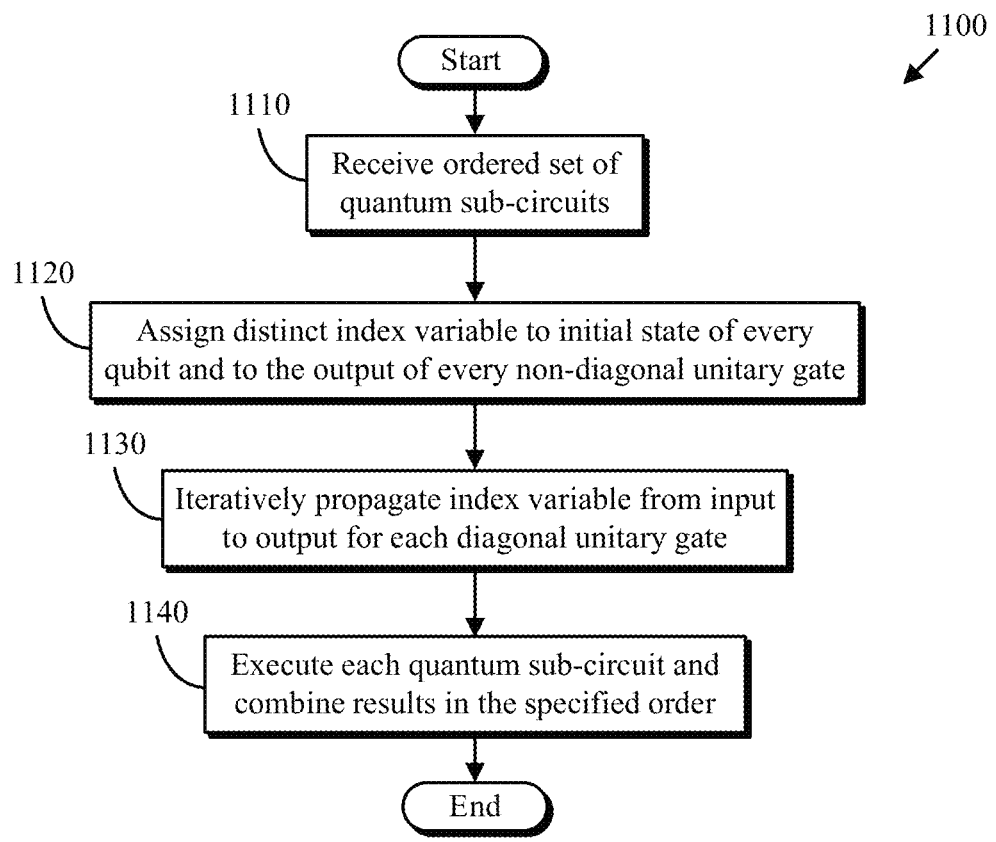
FIG. 11A is a flowchart depicting one example of a quantum circuit execution method in accordance with at least one embodiment of the present invention.

FIG. 11A is a flowchart depicting one example of a quantum circuit execution method 1100 in accordance with at least one embodiment of the present invention. As depicted, the quantum circuit execution method 1100 includes receiving (1110) an ordered set of quantum sub-circuits, assigning (1120) distinct index variables, propagating (1130) the index variables, executing (1140) each quantum sub-circuit. The quantum circuit execution method 1100, enables execution of a quantum circuit partitioned into sub-circuits. The quantum circuit execution method 1100 may be executed by a computer such as the computer 1500 depicted in FIG. 15.

Receiving (1110) an ordered set of quantum sub-circuits may include receiving an ordered list of pointers to an object or data structure that defines each quantum sub-circuit including the gates contained therein. In one embodiment, the definition for each quantum sub-circuit is essentially a sub-circuit execution plan similar to the execution plan shown in FIG. 5. Assigning (1120) distinct index variables may include assigning a distinct index variable to initial state of every qubit and to the output of every non-diagonal unitary gate.

Propagating (1130) the index variables may include iteratively propagating, from input to output, the index variable for each diagonal unitary gate. Executing (1140) each quantum sub-circuit may include executing each quantum sub-circuit and combining the generated results in the specified order.

Figure 11B:
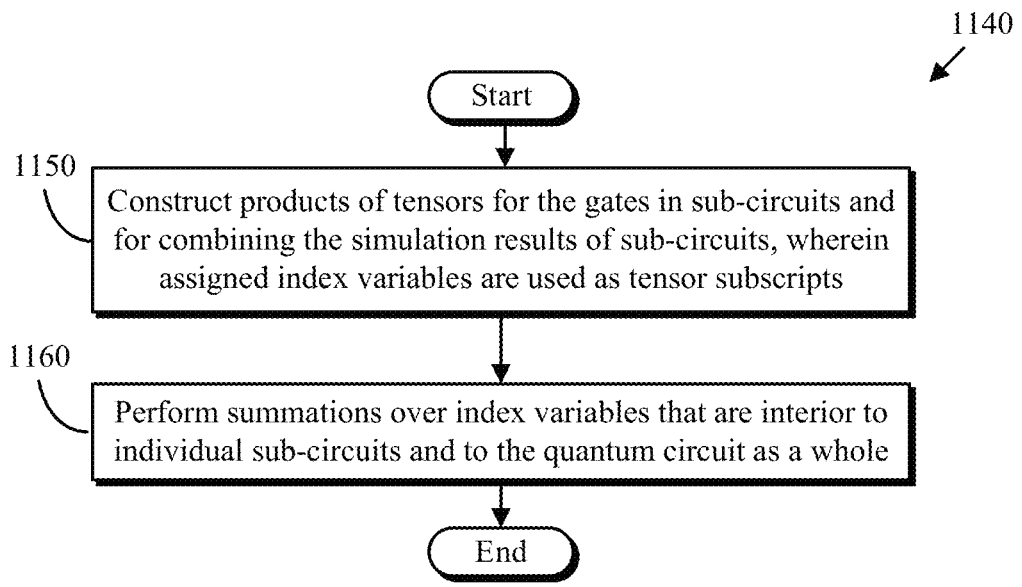
FIG. 11B is a flowchart depicting additional details of the quantum circuit execution method depicted in FIG. 11A.

FIG. 11B is a flowchart depicting a possible embodiment of the executing operation 1140 depicted in FIG. 11A. As depicted, an embodiment of executing (1140) sub-circuits and combining results may include constructing (1150) products of tensors and performing (1160) summations.

Constructing (1150) products of tensors may include identifying the gates that belong to sub-circuits together with the index variables assigned to those gates at steps 1120 and 1130, assigning these index variables as subscripts to the corresponding tensors for the gates in sub-circuits, and assembling the tensors for sub-circuits into products arranged in input-to-output order. Constructing (1150) products of tensors may also include assembling tensors corresponding to the simulation results of sub-circuits into products of tensors in accordance with execution orderings arrived at through the determining operation 740 described in conjunction with FIG. 7 and/or the determining operation 1040 described in conjunction with FIG. 10.

Performing (1160) summations may include calculating products of tensors for sub-circuits in the input-to-output order determined in the constructing operation 1150 described above and performing summations over index variables that are interior to those sub-circuits as they are encountered in the determined input-to-output order. Performing (1160) summations over index variables that are interior to a circuit as a whole may include performing summations over such index variables when calculating products of tensors determined in the constructing operation 1150 described above for combining simulation results of sub-circuits. In cases where no gates remain to be simulated in a circuit for a qubit, or where all remaining gates for that qubit are diagonal-unitary gates, this combining of simulation results of sub-circuits may be preceded by the introduction of for-loops that loop over the possible values of one or more such qubits. Subsequent tensor products and their summations may then be calculated for slices of affected tensors to reduce the memory requirements of subsequent calculations.

Figure 12C:
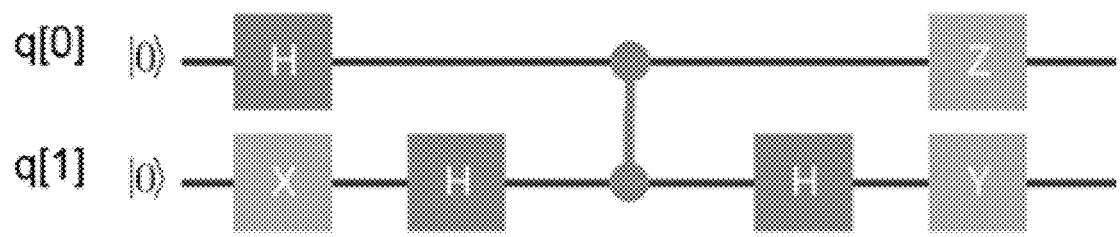

FIGS. 12A-12C are schematic diagrams depicting one example of optimizing one particular example of a quantum circuit. In some embodiments, gate substitutions (also known as circuit rewriting) may be conducted at various points within the methods disclosed herein. For example, a circuit rewrite such as the rewrite shown in FIG. 12B could be performed in conjunction with step 720 of the method 700 shown in FIG. 7 or when performing step 1080 of the method 1000 shown in FIG. 10. In particular, replacing a bridging CNOT gate with an equivalent configuration of a CZ gate and Hadamard gates can reduce the number of entangled indices that are introduced when the corresponding sub-circuits are entangled, which in turn has the effect of reducing the amount of memory required to simulate the resulting entangled sub-circuits.

Referring back to step 1140 of FIG. 11A and its possible embodiment as illustrated in FIG. 11B, one of skill in the art will appreciate that in at least one embodiment of the present invention sub-circuits may be efficiently simulated in input-to-output order starting with the initial sub-circuits created from the initial states of the individual qubits. With such as approach, subsequent sub-circuits would not be simulated until the preceding sub-circuits that they depend on for input have been simulated. Simulation results for each sub-circuit may correspond to n-dimensional tensors that can be represented in computer memory as n-dimensional arrays. Persons skilled in the art will recognize that other data structures, such as linear arrays, may also be employed that provide equivalent representations.

In one embodiment, the values stored in these data structures may be double-precision complex floating-point numbers that each require 16 bytes of storages. The memory footprint of an n-dimensional tensor/array would then require $2^{(n+4)}$ bytes to store all $2^n$ values in the tensor/array.

The initial sub-circuits created from the initial states of the individual qubits may be one-dimensional tensors/arrays that are initialized with a value of one in the zero position and a value of zero in the one position. This initialization corresponds to the Kronecker delta tensor $$\delta_i = \begin{cases} 1 & i = 0 \\ 0 & i \neq 0 \end{cases}$$

that in turn corresponds to the quantum ground state $|0\rangle$:

$$|0\rangle = \begin{bmatrix} 1 \\ 0 \end{bmatrix}.$$

For subsequent sub-circuits that depend on only one preceding input sub-circuit, the simulation-result arrays may be initialized using the simulation results of the preceding input sub-circuit. In general, if the simulation-result tensor/array of a preceding input sub-circuit has dimension n and if s new qubits have been identified for slicing for the corresponding subsequent sub-circuit that were not already being sliced in the simulation of the preceding input sub-circuit, then the simulation of this subsequent sub-circuit may involve introducing for-loops to loop over the possible values of the s new qubits identified for slicing (if any), creating an n−s dimensional tensor/array (or other suitable data structure to hold the simulation results for the subsequent sub-circuit), and then initializing this n−s dimensional tensor/array by copying corresponding values from the simulation results for the preceding input sub-circuit for the slice identified by the values of the for-loop variables (if any). Simulation calculations for the current subsequent sub-circuit in question may then take place within these for-loops, as may the simulation calculations of all downstream sub-circuits that have not yet been simulated because these slicing for-loops are likewise applicable to these downstream sub-circuits.

For subsequent sub-circuits that depend on two preceding input sub-circuits, the initial number of dimensions for the simulation results of such a subsequent sub-circuit is given by n+m−g−s, where n and m are the numbers of dimensions in the simulation results of the preceding two input sub-circuits, respectively, g is the number of entangled indices shared between these two sub-circuits that can be summed over at this stage of the processing, and s is the number of new qubits identified for slicing for this subsequent sub-circuit that were not already being sliced in the simulations of either of the preceding input sub-circuits. The simulation of this subsequent sub-circuit may involve introducing for-loops to loop over the possible values of the s new qubits identified for slicing (if any), creating an n+m−g−s dimensional array or other suitable data structure to hold the simulation results for the subsequent sub-circuit, and then initializing this n+m−g−s dimensional array by performing a tensor multiplication of the simulation results of the two preceding input sub-circuits for the slices identified by the values of the for-loop variables (if any) and summing over the entangled indices (if any) shared between these two sub-circuits that can be summed over at this stage of the processing.

When the simulation results of preceding input sub-circuits are combined in this fashion to initialize the simulation of a subsequent sub-circuit, the shared entangled indices that can be summed over are those for which the simulation results from all of the sub-circuits that were originally entangled to create the entangled indices are now finding their way, either directly or indirectly, into this final combining operation, and these indices do not appear as output indices for any of these preceding input sub-circuits. The first part of this requirement reflects the distributive law of algebra: in order to sum over an index variable, all terms that contain that contain that index variable as a subscript must appear within the summation. The second part of this requirement reflects the conditions under which an index variable for a quantum circuit can be summed: the variable must be completely interior to the circuit up to current point of the simulation, it cannot be associated with an output. Usually, when a circuit does contain multi-qubit gates for two qubits only, the first part of the above requirement will be met whenever the simulation results of two sub-circuits being combined share a common entangled index. However, if a circuit contains three-qubit gates or more, then this first condition must be explicitly checked.

The case in which the simulation results of more than two preceding input sub-circuits need to be combined as input to a subsequent sub-circuit can only occur when applying the process illustrated in flowchart 1000 for quantum circuits that contain multi-qubit gates for three or more qubits. The simulation steps for these cases can follow the same structure as for the two-sub-circuit case discussed above, including the above conditions for deciding which shared entanglement indices should be summed over. In general, it can be computationally advantageous to combine these results in a pairwise fashion by repeated application of the two-input method described above. As a rule of thumb, the pair of results to combine at each step should be the pair that yields the lowest-dimension tensor/array as a result of that step. This rule of thumb helps reduce the total number of floating-point operations that need to be performed to calculate the combined simulation results. This same method can used at the end of the simulation to combine simulation results of final sub-circuits when two or more sub-circuits remain.

Once the tensor/array for holding the simulation results of a sub-circuit has been initialized, the final simulation results for that sub-circuit may be computed by applying gates to the tensor/array in input-to-output order. For gate applications that do not result in the introduction of entangled indices, the equations that define these computations have the forms illustrated in FIGS. 3-5, where $\psi$ represents the value of the simulation-result tensor/array before a gate is applied and $\psi$ represents the value after a gate has been applied. The equations that appear in FIGS. 3-5 are only illustrative and persons skilled in the art will recognize that corresponding equations can be readily constructed in obvious ways for other types of quantum gates not listed.

Gate applications that result in the creation of entangled indices require different handling in that such gate applications typically increase the number of dimensions in simulation-result tensors/arrays and the need then arises to keep track of which dimensions now correspond to the qubits assigned to a sub-circuit versus which dimensions correspond to entangled indices.

When a decision is made to entangle sub-circuits at step 1060 in the process depicted in FIG. 10 and a bridging multi-qubit gate is then assigned to one the of the sub-circuits at step 1080, the simulation-result tensor/array for the sub-circuit to which the multi-qubit gate is assigned must be increased in size during simulation when that multi-qubit gate is simulated. One extra dimension must be added if the multi-qubit gate is a two-qubit diagonal-unitary gate and two extra dimensions must be added in the case of a two-qubit non-diagonal-unitary gate. Corresponding increases in dimensions must be made in the case of three or more qubit gates. These extra dimensions correspond to entangled indices.

Figure 13A:
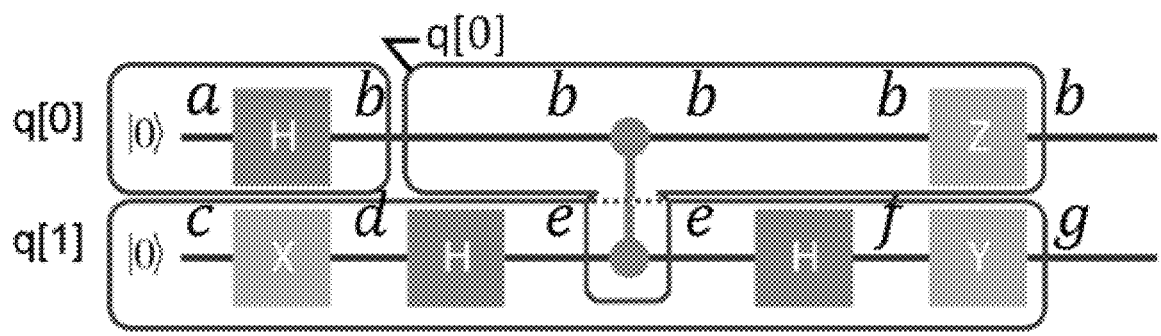
FIGS. 13A-13D are schematic diagrams depicting four examples of partitioning and executing one particular example of a quantum circuit.

For example, consider the quantum circuit and sub-circuits depicted in FIG. 13A. These sub-circuits may be obtained using the process depicted in FIG. 10 in the following manner. After creating sub-circuits for qubits q[0] and q[1] at step 1010, the top-left H gate may be assigned to the sub-circuit for q[0] at step 1020 and it may then be noticed that all remaining gates for qubit q[0] are diagonal-unitary. The latter allows the top-left sub-circuit for q[0] to be closed and a new sub-circuit to be started for qubit q[0] with an annotation that qubit q[0] can now be sliced. Also at step 1020, the bottom-left X and H may be assigned to the sub-circuit for qubit q[1]. No additional gates can be assigned to current sub-circuits at step 1020 because of the bridging CZ gate, so the process may proceed to step 1050 to select the CZ gate. At step 1060, a decision may be made to entangle the sub-circuits for q[0] and q[1], and at step 1080 the CZ gate may be assigned to the current sub-circuit for q[0]. The process may then proceed back to step 1020 where the top-left Z gate may be assigned to the current sub-circuit for q[0] and the bottom-left H and Y gates may be assigned to the sub-circuit for q[1], resulting in the configuration of sub-circuits depicted in FIG. 13A.

Continuing on to steps 1150 and 1160 in FIG. 11B that depict an embodiment of the execution step 1140 in FIG. 11A, the simulation of the top-left sub-circuit may proceed by initializing the tensor/array containing the simulation results for the top-left sub-circuit to the Kronecker delta tensor and then applying the H gate to update the simulation results:

$$\varphi'_a = \delta_a, \varphi'_b \leftarrow \sum_a H_{ba}\varphi'_a$$

The simulation of the top-right sub-circuit may then involve introducing a slicing for-loop for qubit q[0] and initializing the tensor/array for the top-right sub-circuit to be equal to a slice of $\varphi'_b$:

```
For x in {0,1} do {
    τ'_b|_{b=x} = φ'_b|_{b=x}
    ...
}
```

Because the CZ gate was allocated to the top-right sub-circuit when it was entangled with the bottom sub-circuit, a new tensor/array may be allocated with an additional dimension to accommodate the entangled index e in the process of simulating the CZ gate:

```
For x in {0,1} do {
    τ'_b|_{b=x} = φ'_b|_{b=x}
    τ''_{be}|_{b=x} = CZ_{be}|_{b=x} τ'_b|_{b=x}
    ...
}
```

Simulation of the Z gate may then be performed as usual to update this new tensor/array:

```
For x in {0,1} do {
    τ'_b|_{b=x} = φ'_b|_{b=x}
    τ''_{be}|_{b=x} = CZ_{be}|_{b=x} τ'_b|_{b=x}
    τ'''_{be}|_{b=x} ← Z_b|_{b=x} τ''_{be}|_{b=x}
    ...
}
```

In the case of sub-circuits that are not assigned a multi-qubit gate when an entangling decision is made, the point(s) at which simulation-result tensor/arrays must increase in size (if at all) depends on the number of entangled indices that are introduced and on which (if any) of them are strictly interior to a sub-circuit and/or interior to the circuit as a whole. Each entangled index that is interior to a sub-circuit that was not assigned a multi-qubit gate when it was entangled will add an extra dimension to the simulation-result tensor/array for that sub-circuit. An entangled index that is not interior to a sub-circuit that was not assigned a multi-qubit gate when it was entangled but that is interior to the circuit as a whole will add an extra dimension to the simulation-result tensor/array of some downstream sub-circuit. The reason is that all indices that are interior to a circuit must be summed over at some point in the simulation.

The purpose of introducing entangled indices is to defer these summations until later stages of the simulation by increasing the dimensions of the simulation-result tensors/arrays in order to perform the necessary computational bookkeeping to make this technique work, and to then perform the summations when the simulation results of sub-circuits that share entangled indices are combined. It is therefore important to keep track of entangled indices across an entire circuit in order to handle them properly. The exact points at which such increases in dimension occur depends on whether the multi-qubit gate that is involved is diagonal-unitary or non-diagonal.

As an example, in the case of the bottom sub-circuit depicted in FIG. 13A, the simulation results may be initialized to the Kronecker delta tensor and then the X gate and first H gate may be applied as usual:

$\phi'_c = \delta_c$
$\phi'_d \leftarrow \sum_c X_{dc} \phi'_c$
$\phi'_e \leftarrow \sum_d X_{ed} \phi'_d$ The CZ gate is not assigned to this sub-circuit, so index variable e becomes the entangled index that accounts for the effects of the CZ gate on this sub-circuit. A summation over e cannot be performed when the second H gate is applied because e is an entangled index. Instead, a new tensor/array may be allocated with an additional dimension to accommodate the entangled index e in the process of simulating the second H gate:

$\phi'_c = \delta_c$
$\phi'_d \leftarrow \sum_c X_{dc} \phi'_c$
$\phi'_e \leftarrow \sum_d H_{ed} \phi'_d$
$\phi''_{ef} = H_{fe} \phi'_e$ Simulation of the Y gate may then be performed as usual to update this new tensor/array:

$\phi'_c = \delta_c$
$\phi'_d \leftarrow \Sigma_c X_{dc} \phi'_c$
$\phi'_e \leftarrow \Sigma_d H_{ed} \phi'_d$
$\phi''_{ef} = H_{fe} \phi'_e$
$\phi''_{eg} \leftarrow \Sigma_f Y_{gf} \phi''_{ef}$ Note that H gates normally require summations because they are non-diagonal gates. This summation will ultimately be performed according to the rules for summing over entangled indices when combining the simulation results of sub-circuits. The introduction of entangled indices is a mechanism for deferring these summations until later stages of the simulation.

The entangled index e may finally be summed when the results of the top-right and bottom sub-circuits are combined. Because the top-right sub-circuit is simulated in slices, the combining step for the final simulation results $\psi_{bg}$ of the circuit would be performed inside the slicing for-loop for the top-right tensor:

```
For x in {0,1} do {
    τ'_b|_{b=x} = φ'_b|_{b=x}
    τ''_{be}|_{b=x} = CZ_{be} |_{b=x} τ'_b|_{b=x}
    τ''_{be}|_{b=x} ← Z_b|_{b=x} τ''_{be}|_{b=x}
    ψ_{bg}|_{b=x} = Σ_e τ''_{be}|_{b=x} φ''_{eg}
}
```

Figure 13B:
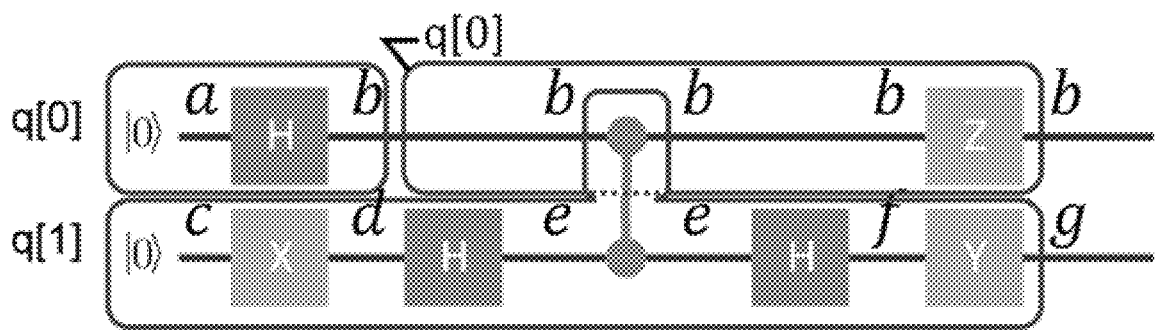

FIG. 13B illustrates an alternative set of sub-circuits for the same circuit depicted in FIG. 13A, wherein the CZ gate is assigned to the bottom sub-circuit instead of the top-right sub-circuit at step 1080 in FIG. 10. In this case, b is now the entangled index. In the simulation of the bottom sub-circuit, the initial simulation-result tensor/array may be initialized to be one dimensional and may then be increased to be two dimensional when the CZ gate is applied.

$\phi'_c = \delta_c$
$\phi'_d \leftarrow \Sigma_c X_{dc} \phi'_c$
$\phi'_e \leftarrow \Sigma_d H_{ed} \phi'_d$
$\phi''_{be} = CZ_{be} \phi'_e$
$\phi''_{bf} \leftarrow \Sigma_e H_{fe} \phi''_{be}$
$\phi''_{bg} \leftarrow \Sigma_f Y_{gf} \phi''_{bf}$ In the simulation of the top-right sub-circuit, the simulation-result tensor/array may be initialized to be a slice of the top-left sub-circuit results as before, but this time the dimensionality is not increased when the Z gate is simulated because the entangled index b is already an index of the simulation results and Z is a diagonal-unitary gate so it does not require a summation over b to be performed when it is applied. Consequently, b is not interior to the sub-circuit, it is an output index:

```
For x in {0,1} do {
    τ'_b|_{b=x} = φ_b|_{b=x}
    τ'_b|_{b=x} ← Z_b|_{b=x} τ'_b|_{b=x}
    ...
}
```

Note that if the above sub-circuits were part of a larger circuit in which a non-diagonal gate were eventually applied to qubit q[0] in a subsequent sub-circuit, then the dimensionality of the simulation-result tensor/array for the top-right sub-circuit would still not have changed, but also q[0] would not have been sliced as part of the simulation of the top-right sub-circuit. Instead, the increase in the dimensionality of a simulation-result tensor/array to accommodate the entangled index variable b would have occurred during the simulation of the subsequent sub-circuit that contained the non-diagonal gate being applied to qubit q[0] because at that point b would become an interior index of the circuit as a whole and it would therefore have to be summed over.

As with the sub-circuits depicted in FIG. 13A, the simulation results for the top-right and bottom tensors depicted in FIG. 13B would be combined inside the slicing for-loop for the top-tensor, but this time, because b is not interior to the circuit as a whole, b would not be summed over when the results are combined:

```
For x in {0,1} do {
    τ'_b|_{b=x} = φ_b|_{b=x}
    τ'_b|_{b=x} ← Z_b|_{b=x} τ'_b|_{b=x}
    ψ_{bg}|_{b=x} = τ'_b|_{b=x} φ''_{bg}
}
```

Figure 13C:
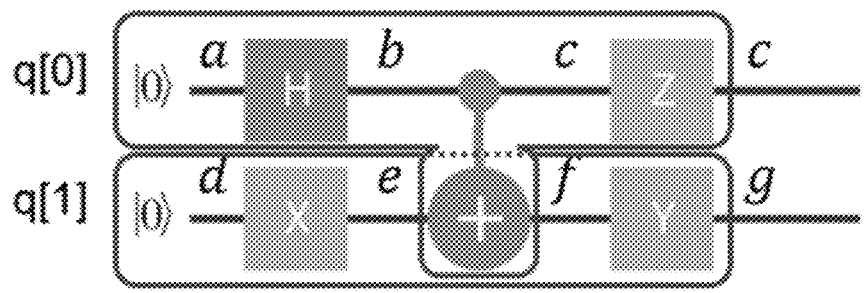

As previously mentioned, two-qubit non-diagonal-unitary gates result in two entangled indices when a decision is made to entangle two sub-circuits bridged by such a gate. The circuit and sub-circuits shown in FIG. 13C provide an example. These sub-circuits may be obtained by choosing to entangle the top and bottom sub-circuits at step 1060 of FIG. 10 and then assigning the CNOT gate to the top sub-circuit at step 1080 without performing a circuit rewrite to replace the CNOT with a CZ gate and H gates. By assigning the CNOT gate to the top sub-circuit, e and f both become entangled indices. When the top sub-circuit is simulated, an initial one-dimensional tensor/array may be created to hold the simulation results and a three-dimensional tensor/array may then be created when simulating the CNOT:

$\tau'_a = \delta_a$
$\tau'_b \leftarrow \Sigma_a H_{ba} \tau'_a$
$\tau''_{cef} = \Sigma_b CNOT_{cfbe} \tau'_b$
$\tau''_{cef} \leftarrow Z_c \tau''_{cef}$ When the bottom circuit is simulated, an initial one-dimensional tensor/array may be created to hold the simulation results and a three-dimensional tensor/array may then be created when simulating the non-diagonal Y gate:

$\phi'_d = \delta_d$
$\phi'_e \leftarrow \Sigma_d X_{ed} \phi'_d$
$\phi''_{efg} = Y_{gf} \phi'_e$ The entangled indices may then be summed over when the results are combined because they are both interior to the circuit as a whole:

$\psi_{cg} = \Sigma_{ef} \tau''_{cef} \phi''_{efg}$

Figure 13D:
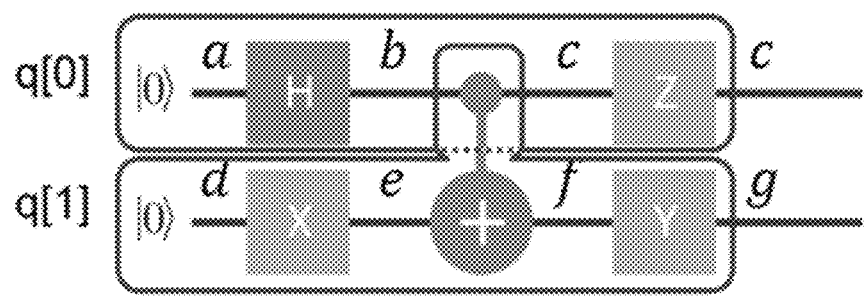

In the case in which the CNOT gate is assigned instead to the bottom sub-circuit at step 1080 of FIG. 10, then b and c become the entangled indices as shown in FIG. 13D. When the top sub-circuit is simulated, an initial one-dimensional tensor/array may be created to hold the simulation results and only a two-dimensional tensor/array may be created when simulating the Z gate. In this case, b is already an entangled index and the simulation of the Z gate introduces c into the index variables of the simulation-result tensor/array.

$\tau'_a = \delta_a$
$\tau'_b \leftarrow \Sigma_a H_{ba} \tau'_a$
$\tau''_{bc} = Z_c \tau'_b$ When the bottom sub-circuit is simulated, an initial one-dimensional tensor/array may be created to hold the simulation results and a three-dimensional tensor/array may then be created when simulating the CNOT:

$\phi'_d = \delta_d$
$\phi'_e \leftarrow \Sigma_d X_{ed} \phi'_d$ $\phi''_{bcf} = \Sigma_e \text{CNOT}_{cfbe} \phi'_e$ $\phi''_{bcg} \leftarrow \Sigma_g Y_{gf} \phi''_{bcf}$ Because c is an output index and not interior to the circuit, a summation is performed only over b, but not c, when the simulation results of the top and bottom sub-circuits are combined:

$\psi_{cg} = \Sigma_b \tau''_{bc} \phi''_{bcg}$

Note that once slicing for-loops are introduced, subsequent simulation steps need to be performed within those for-loops, including the slicing for-loops of sub-circuits that are simulated after this point is reached. Thus, all sub-circuits that are simulated without slicing should be simulated prior to the introduction of slicing loops in the execution in order to avoid redundant re-computation of those simulation results. Note that the introduction of slicing is strictly optional provided that sufficient memory is available to hold the resulting simulation results. One can pick and choose which simulation results one does actually slice from among those that are possible to slice. Those skilled in the art will also recognize the possibility of storing full simulation results of some sub-circuits in secondary storage and then retrieving slices of these simulation results within slicing loops. These full simulation results may themselves be computed in slices when possible and written to secondary storage without having to materialize the full simulation results in main memory.

Those skilled in the art will likewise recognize that slicing loops are needed only if the purpose of the computation is to calculate all amplitudes in the final quantum state of a circuit. If, instead, one simply wanted to calculate the amplitude of a measured outcome, the for-loops can instead be replaced with set values for those qubits as dictated by the measured outcomes. The slicing operations would still be performed, but now using the measured values of the corresponding qubits. If amplitudes for a set of measurements need to be calculated, then, for the sake of efficiency, the simulation results of sub-circuits that cannot be sliced could be calculated first and a loop could then be set up to iterate over each measured outcome and set the values of the sliced qubits accordingly at each iteration. With this simulation approach, there is no longer a need to nest for-loops, which can provide greater freedom in the order of simulation of the remaining sub-circuits.

Figure 14:
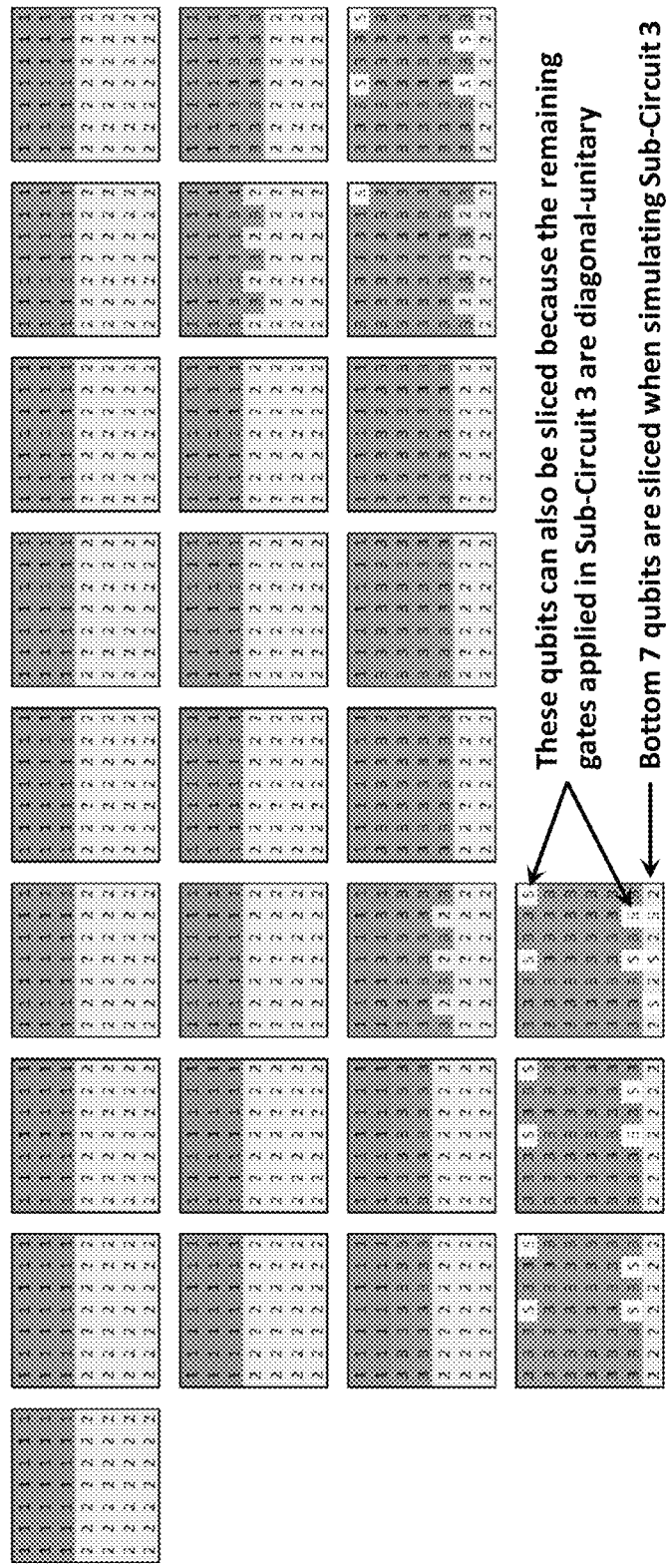
FIG. 14 is a circuit partitioning depicting sub-circuits of the large quantum circuit corresponding to FIG. 5 that enables simulation on currently available computing systems.

FIG. 14 depicts a partitioning of the large quantum circuit corresponding to FIG. 5 into sub-circuits that enables the quantum circuit to be simulated on currently available computing systems. FIG. 5 depicts a quantum circuit that belongs to a class of randomly generated quantum circuits specifically designed by Boixo et al. to be apparently impossible to simulate on existing classical computers. As they claimed in their 2016 paper, "State-of-the-art supercomputers cannot simulate universal random circuits with depth 25 in a 2D lattice of approximately 7×7 qubits with any known algorithm and significant fidelity," the rationale for this statement being that such simulation using known techniques would require 8 petabytes of main memory just to store quantum state information and no existing supercomputer possesses that much memory. By partitioning the 7×7 qubit, depth 27 circuit depicted in FIG. 5 and simulating it using the present invention, we were able to simulate the circuit using only 4.5 terabytes to store the simulation-result tensors/arrays.

FIG. 14 depicts the partitioning we employed. The gates in FIG. 5 that belong to the portions of the corresponding tiles in FIG. 12 containing the number "1" with a white background belong to one sub-circuit that will be referred to as the top sub-circuit. The gates in FIG. 5 that belong to the portions of the corresponding tiles in FIG. 12 containing the number "2" with a light grey background belong to another sub-circuit that will be referred to as the bottom sub-circuit. The gates in FIG. 5 that belong to the portions of the corresponding tiles in FIG. 12 containing the number "3" with a dark grey background, or containing the letter "S" in white with a black background, belong to a third sub-circuit that will be referred to as the "left" sub-circuit. The top and bottom sub-circuits are entangled, where the bridging gates are the CZ gates that span the third and fourth rows of the two rightmost tiles in the top row of tiles depicted in FIG. 5. These CZ gates can be assigned to either the top or bottom sub-circuits without affecting the ability to simulate the circuit. In the simulation we performed, these CZ gates were arbitrarily assigned to the bottom sub-circuit. The top and bottom sub-circuits combined required 0.5 terabytes to store their simulation results, while the left sub-circuit required 4 terabytes. After calculating the simulation results for the top and bottom sub-circuits, slicing loops were set up to slice the values of the qubits identified by the letter "S" and colored light green, as well as the remaining qubits corresponding to the bottom of the 7×7 tiles. Computations of the slices were performed on four racks of an IBM Blue Gene Q computer that provided 64 terabytes of available main memory. Different ranges of the loops were executed on six different groups of four racks to speed up the overall computation by a factor of six.

One slice of a 8×7 qubit, depth 23 random quantum circuit (not depicted) was also simulated. This 56-qubit circuit was partitioned in a very similar manner In this case, the simulation results for the three sub-circuits constructed required only 3 terabytes of main memory to store. By comparison, prior-art simulation methods would have required 1 exabyte to store and operate on the entire quantum state in main memory. These examples serve to illustrate the tremendous advantage of the present invention for quantum simulation.

Based on the presentation above, it should be apparent to persons skilled in the art how to calculate the initial and final sizes of the simulation results of each sub-circuit and of the final simulation results in terms of number of dimensions and byte counts for each of the above use cases, as well as other possible use cases of the invention. It should also be apparent to persons skilled in the art how to estimate the number of floating-point operations needed to simulate each sub-circuit and combine the final results for each of the above use cases for how the invention might be practiced, as well as other possible use cases of the invention. Persons skilled in the art will recognize that a variety of prior-art optimization techniques can be employed in connection with the process illustrated in FIG. 10 to, for example, find circuit partitionings that minimize the number of floating-point operations for each of the above use cases, as well as other possible use cases of the invention, subject to a limit placed on the maximum memory available on a target deployment system. Examples include depth-first search, breadth-first search, iterative deepening depth-first search, Dijkstra's algorithm, and A* search.

Those skilled in the art will recognize that implementing the process depicted in FIG. 10 as a depth-first recursive optimization process may involve introducing a loop at each decision point in this process depicted in FIG. 10 to loop over all possible decision choices, then within these loops recursively invoking the process depicted in FIG. 10 from those points in the process forward for each possible choice, and at the end of the loops returning the choices that optimize a desired recourse cost measure. These decision points may include step 1050 for selecting an assignable bridging gate, step 1060 for choosing whether to entangle sub-circuits, step 1080 for assigning a bridging gate to a sub-circuit, and step 1040 for determining a sub-circuit execution order. Some decisions at these points may instead be made by applying rules of thumb while other decisions may be included as part of the depth-first search. Desired resource cost measures to be minimized may include the maximum memory requirements, the total number of floating-point operations to calculate all amplitudes, or the total number of floating-point operations to calculate a single amplitude. Conditional tests may also be introduced to abandon choices if desired constraints are violated. Desired constraints may include having the total memory requirements for a simulation remain within a specified limit. They may also include a limit on the total runtime consumed by the depth-first process itself. The depth-first process may be implemented to keep record of the current best set of choices found thus far according to a desired resource cost measure so that if the depth-first process is terminated before a complete search is performed, such as when a runtime limit is imposed, then benefit may still be obtained from having executed the depth-first process.

Those skilled in the art will recognize that the depth-first search process just described effectively generates a tree of possible sequences of decision choices together with circuit partitionings that are thereby induced. Breadth-first search explores this tree one level at a time. Those skilled in the art will recognize that breadth-first search may be implemented as iteratively deepening depth-first search wherein a limit is placed on the number of decisions that are made and branches of the search tree are abandoned once this limit is exceeded. The motivation for breadth-first search is that search costs tend to grow exponentially with search depth, so if a reasonable solution to an optimization problem can be found within a shallow search depth, then perhaps that solution might be adequate. If not, then the search can be deepened by increasing the depth limit and performing the search over again.

In the context of the present invention, a limit may also be placed not simply on the depth of the search, but alternatively on the number of times the entangling choice can be selected at step 1060 in FIG. 10. If the choice to entangle were never made at Step 1060 and instead one were to always proceed to step 1070, then the number of times step 1070 would be executed would never be more than the number of qubits. The reason is that step 1070 has the effect of combining groups of qubits together as a by-product of combining the results of sub-circuits together and the number of such grouping operations cannot be more than the number of qubits being grouped. Each time the choice to entangle sub-circuits is made at step 1060, the effective search tree becomes wider at that point and grows at least one extra level deeper. Placing an iteratively increasing limit on the number of times the choice to entangle can be made may thereby limits the amount of search that is performed for a given setting of the limit (which is the underlying purpose of breadth-first search) while at the same time performing a search optimization over a set of fully-partitioned circuits. By contrast, simply limiting the depth of the search would cause branches in the search tree to be prematurely terminated before a circuit is fully partitioned into sub-circuits, thereby wasting a great deal of effort generating and exploring non-solutions in the search tree.

A variation on breadth-first search that may likewise be suitable for use with the present invention is Dijkstra's algorithm. Given any sequence of choices made at the various decision points in the process depicted in FIG. 10, one may estimate recourse costs measures that would be consumed by the resulting simulation process up to the corresponding point in the actual simulation. Examples include the cumulative number of floating-point operations thus far and the maximum memory requirement thus far. Those skilled in the art will recognize that Dijkstra's algorithm may be implemented by placing data structures into a priority-queue data structure that encode sequences of decision choices together with resource costs measures up to the corresponding points in resulting simulation. Dijkstra's algorithm may then proceed by selecting the lowest-cost sequence of decision choice from the priority queue, estimating the resource costs associated with taking each of the possible next decision choices, and placing the resulting next-step decision choices and associated resource costs into the priority queue, and repeating. Dijkstra's algorithm may be initialized for the process depicted in FIG. 10 by placing and initially empty sequence of decision choices into the priority queue together with the resource costs of performing steps 1010 and 1020, which are precursors to the first decision point corresponding to step 1050. Conceptually speaking, Dijkstra's algorithm operates by identifying the lowest-cost sequence of decisions obtained thus far and then seeing where that sequence of decisions leads next once the outcomes of the next decision point are incorporated.

Those skilled in the art will recognize that a further variation on Dijkstra's algorithm is A* search. A* search modifies Dijkstra's algorithm by combining the costs that result from sequences of decision choices with lower-bound estimates of how much those costs will increase if optimal sequences of decision choices were made from those points forward. Conceptually speaking, A* search operates by identifying the sequence of decisions with the lowest total-cost estimate (versus cost up the current point in the search) and seeing where that sequence of decisions leads next once the outcomes of the next decision point are incorporated. In the context of the present invention, a lower bound to the number of remaining floating-point operations may be obtained by calculating the costs of applying any remaining gates assuming that the existing tensors will not increase in size. In the case of a multiqubit gate that bridges sub-circuits, the size of the smallest bridged sub-circuit may be used to calculate a lower-bound to the cost of applying that multiqubit gate. A lower bound to the increase in memory requirements may be to assume that no further increases in memory requirements takes place.

Figure 15:
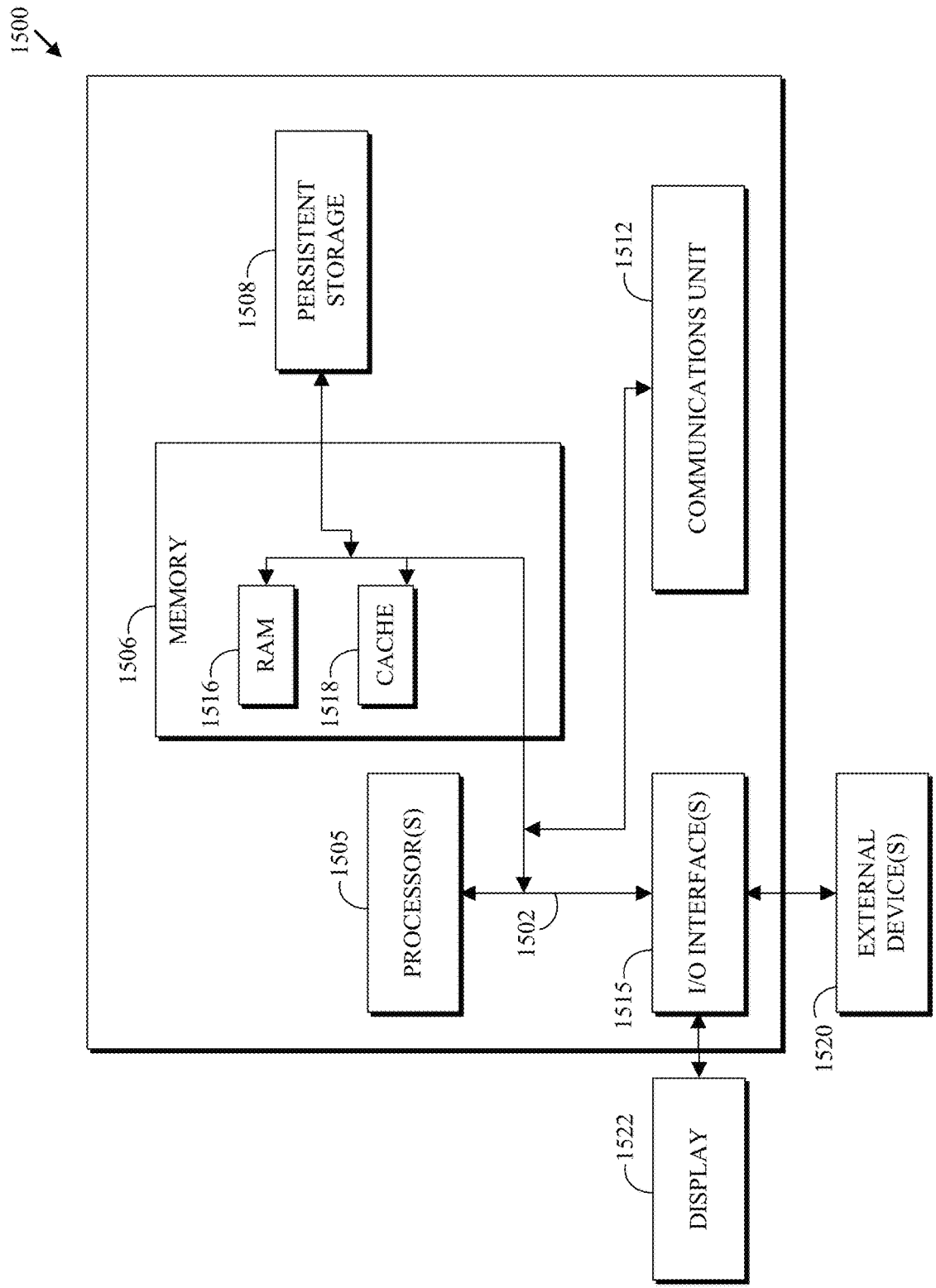
FIG. 15 is a block diagram depicting one example of a computing apparatus suitable for executing one or more of the methods disclosed herein.

FIG. 15 is a block diagram depicting one example of a computing apparatus (i.e., computer 1500) suitable for executing the methods disclosed herein. It should be appreciated that FIG. 15 provides only an illustration of one embodiment and does not imply any limitations with regard to the environments in which different embodiments may be implemented. Many modifications to the depicted environment may be made.

As depicted, the computer 1500 includes communications fabric 1502, which provides communications between computer processor(s) 1505, memory 1506, persistent storage 1508, communications unit 1512, and input/output (I/O) interface(s) 1515. Communications fabric 1502 can be implemented with any architecture designed for passing data and/or control information between processors (such as microprocessors, communications and network processors, etc.), system memory, peripheral devices, and any other hardware components within a system. For example, communications fabric 1502 can be implemented with one or more buses.

Memory 1506 and persistent storage 1508 are computer readable storage media. In the depicted embodiment, memory 1506 includes random access memory (RAM) 1516 and cache memory 1518. In general, memory 1506 can include any suitable volatile or non-volatile computer readable storage media.

One or more programs may be stored in persistent storage 1508 for execution by one or more of the respective computer processors 1505 via one or more memories of memory 1506. The persistent storage 1508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1508 may also be removable. For example, a removable hard drive may be used for persistent storage 1508. Other examples include optical and magnetic disks, thumb drives, and smart cards that are inserted into a drive for transfer onto another computer readable storage medium that is also part of persistent storage 1508.

Communications unit 1512, in these examples, provides for communications with other data processing systems or devices. In these examples, communications unit 1512 includes one or more network interface cards. Communications unit 1512 may provide communications through the use of either or both physical and wireless communications links.

I/O interface(s) 1515 allows for input and output of data with other devices that may be connected to computer 1500. For example, I/O interface 1515 may provide a connection to external devices 1520 such as a keyboard, keypad, a touch screen, and/or some other suitable input device. External devices 1520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 1508 via I/O interface(s) 1515. I/O interface(s) 1515 may also connect to a display 1522. Display 1522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by one or more processors, for simulating a quantum circuit comprising a plurality of quantum gates, the method comprising:
   receiving a digital description of quantum gates included in the quantum circuit and dependencies between the quantum gates;
   conducting pre-partitioning optimization to make gate substitutions that reduce resources required to execute the quantum circuit;
   performing the gate substitutions in final stages of the quantum circuit by replacing non-diagonal unitary gates with diagonal-unitary gates, to enable tensor slicing to be performed earlier in the quantum circuit;
   estimating resource cost of possible partitions;
   partitioning the quantum circuit into a plurality of quantum sub-circuits with lowest resource cost, wherein each quantum sub-circuit of the plurality of quantum sub-circuits comprises one or more quantum gates;
   determining an execution order of the plurality of quantum sub-circuits, using dependency information of the plurality of quantum sub-circuits;
   simulating the plurality of quantum sub-circuits, according to the execution order of the plurality of quantum sub-circuits;
   wherein a first quantum sub-circuit and a second quantum sub-circuit of the plurality of quantum sub-circuits each contain one or more gates that are applied to a common qubit; and
   wherein the first quantum sub-circuit and the second quantum sub-circuit are simulated independently using an entangled tensor index.

2. The method of claim 1, wherein all of the gates in the first quantum sub-circuit do not strictly precede nor strictly follow all of the gates in the second quantum sub-circuit.

3. The method of claim 1, wherein the first and the second quantum sub-circuit comprise overlapping gate stages.

4. The method of claim 1, wherein an entangled gated that bridges two sub-circuits is replaced with an equivalent combination of single-qubit gates and a diagonal-unitary entangled gate.

5. The method of claim 1, further comprising transforming the quantum circuit to place entangled gates at one or more later stages of the quantum circuit.

6. The method of claim 1, further comprising transforming the quantum circuit to place diagonal-unitary quantum gates at one or more final stages of the quantum circuit.

7. The method of claim 1, further comprising simulating the final stages of the quantum circuit using results for one or more quantum sub-circuits of the plurality of quantum sub-circuits.

8. The method of claim 1, wherein sub-circuits are simulated in input-to-output order.

9. A computer program product comprising:
   one or more computer readable storage media and program instructions stored on the one or more computer readable storage media, the program instructions comprising instructions for:
   receiving a digital description of a quantum circuit quantum gates included in the quantum circuit and dependencies between the quantum gates;

conducting pre-partitioning optimization to make gate substitutions that reduce resources required to execute the quantum circuit;
performing the gate substitutions in final stages of the quantum circuit, by replacing non-diagonal unitary gates with diagonal-unitary gates, to enable tensor slicing to be performed earlier in the quantum circuit;
estimating resource cost of possible partitions;
partitioning the quantum circuit into a plurality of quantum sub-circuits with lowest resource cost, wherein each quantum sub-circuit of the plurality of quantum sub-circuits comprises one or more quantum gates;
determining an execution order of the plurality of quantum sub-circuits, using dependency information of the plurality of quantum sub-circuits;
simulating the plurality of quantum sub-circuits, according to the execution order of the plurality of quantum sub-circuits;
wherein a first quantum sub-circuit and a second quantum sub-circuit of the plurality of quantum sub-circuits each contain one or more gates that are applied to a common qubit; and
wherein the first quantum sub-circuit and the second quantum sub-circuit are simulated independently using an entangled tensor index.

* * * * *